United States Patent [19]

Wennmyr

[11] Patent Number: 5,485,615
[45] Date of Patent: Jan. 16, 1996

[54] SYSTEM AND METHOD OF INTERACTIVELY DEVELOPING DESIRED COMPUTER PROGRAMS BY USING PLURALITY OF TOOLS WITHIN A PROCESS DESCRIBED IN GRAPHICAL LANGUAGE

[75] Inventor: Einar Wennmyr, Haninge, Sweden

[73] Assignee: Telefonaktiebolaget L M Ericsson, Stockholm, Sweden

[21] Appl. No.: 896,659

[22] Filed: Jun. 10, 1992

[51] Int. Cl.$^6$ .................................................. G06F 15/40
[52] U.S. Cl. .......................... 395/700; 364/148; 364/191; 364/274.2; 364/275.5; 364/280.4; 364/280.5; 364/286; 364/DIG. 1
[58] Field of Search ...................... 395/700, 775, 395/650; 364/274.2, 275.5, 286, 280.5, 973, 280.4, 977, 977.1, 148, 191, 402; 371/19

[56] References Cited

U.S. PATENT DOCUMENTS

| | | |
|---|---|---|
| 4,734,854 | 3/1988 | Afshar . |
| 4,807,108 | 2/1989 | Ben-Arieh et al. ...................... 364/148 |
| 4,827,404 | 5/1989 | Barstow et al. . |
| 4,855,898 | 8/1989 | Kawamura et al. ..................... 364/191 |
| 4,860,204 | 8/1989 | Gendron .............................. 395/700 X |
| 5,051,676 | 9/1991 | Seki et al. .............................. 364/191 |
| 5,075,847 | 12/1991 | Fromme ................................. 395/700 |
| 5,101,491 | 3/1992 | Katzeff . |
| 5,133,045 | 7/1992 | Gaither et al. . |
| 5,168,563 | 12/1992 | Shenoy et al. ......................... 395/500 |
| 5,175,856 | 12/1992 | Van Dyke et al. ..................... 395/700 |
| 5,177,420 | 1/1993 | Wada et al. ............................ 364/191 |
| 5,187,788 | 2/1993 | Marmelstein . |
| 5,253,158 | 10/1993 | Suzuki et al. .......................... 364/191 |
| 5,410,648 | 4/1995 | Pazel ...................................... 395/158 |

FOREIGN PATENT DOCUMENTS

0453371A1 10/1991 European Pat. Off. .

OTHER PUBLICATIONS

"Logic Gem Clarifiers Program Design" by Coffee, Peter, PC Week, V8, N 19, p. 112(2), May 13, 1991.
"CASE Tools", by Burgard, Michael, Government Computer News, V8, N 16, p. 56(4), Aug. 7, 1989.
"Future of Software Engineering" by Fastie, Will, PC Tech Journal, V6, N10, p. 21(7), Oct., 1988.

Primary Examiner—Thomas C. Lee
Assistant Examiner—Moustafa M. Meky
Attorney, Agent, or Firm—Jenkens & Gilchrist

[57] ABSTRACT

The method and system of this invention assist a user in the achievement of a task according to a set of procedures such as those used in the design of software products. A functional description of the process of designing the software is instantiated by the system whereupon the system provides the user with a series of choices relating to the software development. The choices selected, in turn, permit a variety of system tools, each operating in parallel and concurrently, to be used in the development of the software. The system automatically monitors and checks the process during any manipulation and provides error analysis as well as suggested courses of action to the user. The system provides flexible support without requiring the user to follow a rigid development pattern.

14 Claims, 6 Drawing Sheets

BROWSER

SYSTEM AND METHOD OF INTERACTIVELY DEVELOPING DESIRED COMPUTER PROGRAMS BY USING PLURALITY OF TOOLS WITHIN A PROCESS DESCRIBED IN GRAPHICAL LANGUAGE

BACKGROUND OF THE INVENTION

1. Field of the Invention

The present invention relates to a system which assists in the development of software products according to a described set of procedures, and more particularly, to an interactive support medium which automatically monitors, records, invokes and suggests past, present and future actions according to a set of procedures such as those found in many methods related to computer program design.

2. Description of Related Art

For years computer software developers and programmers have desired and sought after tools which ease the burdens associated with the creation of complex computer programs. Software development of the distant, and not so distant, past has required the programmer's specific attention to every detail associated with the program's progression and all the documents, descriptions and the like associated therewith. A computer software system was built, tested, the components revised and the system rebuilt until the programmer created the desired product. As software systems have grown in size and complexity, the number of programmers required for the design of a single system has also grown dramatically. Consequently, it is now quite common that different individual programmers will design separate elements of an overall software system in which each is required to interact and work together in the final product. Clearly, problems of consistency and uniformity arise in such projects. If, for example, one programmer modifies his or her section of the program, ramifications are experienced in other parts of the program which should be brought to the attention of the designers working on those parts. Thus, there exists a need for development support systems which track and assist software developers during the creation of complex computer programs.

One solution is shown, in U.S. Pat. No. 4,860,204 to Gendron et al., wherein a workstation employs methods to construct computer programs through the use of visual graphical representations. The computer based workstation of Gendron allows the user to create a computer program by connecting graphical programming blocks together and thereby create the desired functional result. While the Gendron system performs integrity checks on the interconnections chosen, the system does not provide or automatically present suggestions to the user regarding the courses of action available and the consequences of the actions taken by the user.

Similarly, in U.S. Pat. No. 4,734,854 to Afshar, there is taught a system for designing generic program modules which perform commonly needed computing functions. The user may then integrate the generic module into a specific or concrete software unit and the Afshar system automatically generates a concrete version of the generic module to fit into the specific software unit. This system, while having some automated features, does not inform the user which generic system or tool is required during the development, nor does it suggest alternative avenues of implementation to the user.

Recently, however, Computer-Aided Software Engineering ("CASE") environments have become not only helpful but, in many instances, essential for complex software projects; just as Computer-Aided Design ("CAD") systems have become essential for complex hardware projects. "Software engineering environment" generally refers to an operating system environment and a collection of tools or subroutines which function within the realm of conditions generated by the developing computer program. For example, U.S. Pat. No. 4,809,170 to Leblang et al., teaches a support system for computer aided software engineering applications. The support system of Leblang monitors changes made in the developing system and records such changes for future retrieval. In addition, the system notifies concurrent users of the system of any such changes. However, Leblang does not teach a support system that automatically invokes various program construction tools and interactively forwards suggestions to the user.

The early software engineering environment systems as well as the theories and objectives of software development support are described in general terms in the following articles:

Griffiths, et al., "ALF: Its Process Model and its Implementation on PCTE," *ESPRIT ALF Project*, Technical Paper 1989.

Kaiser, et al. "Intelligent Assistance for Software Development and Maintenance," IEEE Software, 1988.

Clemm, "Replacing Version-Control with Job-Control," Association for Computing Machinery, 1989.

In addition, CASE systems assist users in ways other than code generation. For example, tasks undertaken by software developers which modify a particular aspect of the program not only affect program module elements but other non-code elements of the program as well. Adding an enhancement to the program may also demand updating the program's design specification, user manual, and on-line "help" files. Some steps may involve off-line activities such as communicating the change to others working on the program or using the program, constructing floppy disks for the updated program and transmitting the new disks to programmers and users. The software development process involves much more than just programming, and a practical software development environment should support more than just programming.

Industrial computer program development today begins with describing the methods and procedures by which the particular software should evolve. The description contains numerous standards as well as complex processes requiring a multitude of steps to complete. Previous software support systems comprised "toolboxes" which contained several tools for the accomplishment of a specific task. Tools utilized within these support systems included editors, compilers, flow chart editors etc. The programmer was responsible for choosing the correct tool and for ensuring consistency among various program elements.

Other software support systems have included process programming techniques which describe a process in terms of software. Process programming implements software processes as software. This approach describes as much as possible of the software process by means of a formal language, and the process description is interpreted by the computer which can then guide the user in how to execute a specific task. Prior art process programming techniques, while arguably operating as software development assistance means, do not provide the user with flexible assistance. Instead, prior process programming forces the user to proceed through a variety of different steps in the development process. Users, however, reluctantly accept the forced regiment imposed by the process programming technique. To be truly effective in the software development process, a more flexible support system is required, including one that monitors the actions taken by the user, allows the user to proceed in several directions consistent with the underlying development process, interprets the actions of the user and gives support for the activities performed. Thus, there exists a need in the art for an interactive process programming support system which assists software programmers and engineers in a flexible way in the development of complex computer programs.

SUMMARY OF THE INVENTION

In one embodiment, the present invention includes a method of providing interactive support for the development of a software product according to a specified software process. The method comprises the first step of defining a software process in a specific language which relates the set of steps used in the development of a software product. The description created must then be converted into a form executable by an interpreter. During the interpretation the method generates a menu of choices in which each of the choices constitutes a suggestion regarding possible actions relevant to the specified software process. The user selects one of the choices; whereupon, one of a group of system tools may be initiated and a tool operation performed. The user can also initiate tool operations directly. The results of any operation performed via the tool are tracked to see if it is relevant to the process. An analysis of the results is made, and as an effect, other system tools or other tool operations may be automatically initiated. Subsequently, the user is provided with feedback which covers the current status of the development in light of the prior steps taken.

The method of the present invention includes consistency checks which are specified in a formal process description. These consistency checks can occur after each usage of the system tools and reports of errors discovered during the consistency checks are created. An additional element of the aforementioned method permits browsing through objects within a data base associated with the development. Searching for specific objects within the data base may occur as may initiation of any of the available system tools from the browser.

In another aspect, the invention is a computer system which provides interactive support during a development phase according to a specified software process. The interactive support system includes a means for specifying and storing a formal process description. Further provided within the system is a means for the transformation of the functional process description into an interpretable form. The interpreter includes an expert system as well as a data base that is electronically accessible to the logic interpreter. A message handler which is electronically linked to the logic interpreter handles the communication with a group of system tools which are configured to perform specific tasks related to the described process. Finally a user interface graphically communicates with the user of the system and allows user input as well.

BRIEF DESCRIPTION OF THE DRAWINGS

The invention may be better understood and its numerous objects, features and advantages become apparent to those skilled in the art by referencing the accompanying drawings in which.

DETAILED DESCRIPTION OF THE INVENTION

Everything a user of a support system is doing can be related to the accomplishment of a goal, for example, to create a new software product. Hereinafter the term "process" is used to describe the steps needed to accomplish such goals, including the order in which such steps occur and the like. Processes are a natural way to structure the work of a designer. The description of a process, therefore, must be the result of a careful analysis by experts of how a designer should proceed in an optimal way in order to achieve the intended goal. To describe a process formally in the present invention, a special language called PDL (Process Description Language) is used. In order to assist a designer in the work defined by the process, the PDL description must be executable, otherwise it would only be a description comparable to a textual description. By executing the description, the user of the system receives guidance through all of the steps required to reach the desired goal.

Figure 1:
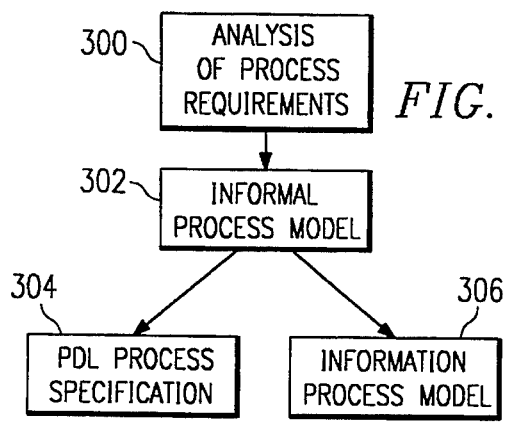
FIG. 1 is a block diagram illustrating the steps needed to define a formal specification of a process.

It should be understood that the present invention comprises two distinct elements. First, the process element, and second, the support system element. Prior to receiving assistance the process to be supported must be described formally, using PDL as described above. This process description is then input (in modified form) to a process description interpreter, whereby the support system can provide assistance in the achievement of the process goals. Thus, FIG. 1 illustrates the initial steps of process definition. The process requirements are analyzed in block 300 and an informal model of the process is then created in block 302 (as for example, a textual description). In blocks 300 and 302 we have an informal indication of what results should be produced and which different steps need to be taken in the process. Next, a PDL process specification is created in block 304, while the information model of the process, such as data schemes, are fabricated in block 306.

The PDL specification is made by system designers responsible for the support system and who specialize in developing processes tailor-made to the needs of a specific company and/or for a specific purpose, e.g., feature design, fault reports, etc. (although an ordinary user could in principle also design a process description). The PDL description, for example, contains a number of basic features. First, it describes the breakdown of a process into separate subprocesses, each subprocess describing tasks that can be performed in parallel with tasks described by other subprocesses so as to increase productivity. This closely matches the situation a designer faces using a modern workstation, where a number of computer tools can be executed in parallel. Each of the tools would then be described by some process in PDL, the subprocess describing what should be achieved by using the tool and how the tool interacts with the other subprocesses or tools. Second, it describes how the tasks described by different subprocesses interact by specifying events that are communicated asynchronously between the processes. Third, the PDL description describes conditions for the start and finish of a specific subprocess. Fourth, it describes the different steps and activities comprising a subprocess, e.g., edit, compile, link, test, and for each of the activities the conditions that need to be fulfilled in order to start that step or activity. Finally, the PDL description illustrates the interaction with the user by dictating how to present information about the state of the process and which possible steps are appropriate to be executed at the present state of the process.

In order for the user to make his or her own choices and to avoid the support system being perceived as a hinderance by restricting the user to a certain sequence of activities, three properties of the PDL description are essential. First, only the state of the process determines what can be done; this assures that the order in which activities are performed are of minimal importance. Second, the PDL description assures flexibility by presenting the user with a number of suggestions relevant to the current state of the process, any of which the user is free to choose. Thus, the support system does not force the user to follow a certain choice of actions. Third, the user can perform activities directly, without using the choices presented by the present invention. These three properties of the PDL description will ensure that the different tasks which the designer has to do can be handled in a way that is not perceived as too rigid.

Figure 2:
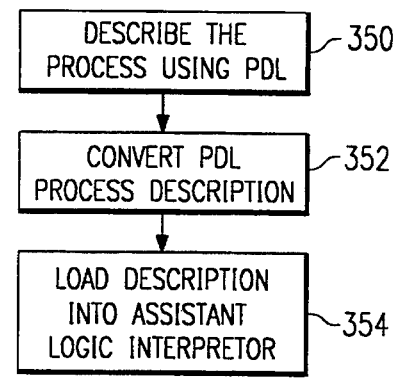
FIG. 2 is a block diagram illustrating the steps required to make a formal specification executable.

Referring now to FIG. 2 there is shown the steps needed to be taken in order to execute the PDL description of the process defined in FIG. 1 and thus give assistance for some particular process. First, in block 350, the PDL description of the process is created. This description is then analyzed and converted in block 352 to the appropriate format for the assistant logic interpreter. Once properly formatted the description is loaded into the assistant logic interpreter 44 (see FIG. 4) at block 354 so that the system can provide the necessary support for the user. These steps are taken by a system programmer in order to prepare the support system to give the assistance expressed in the PDL description. Thus, this readies the second aspect of the invention, i.e., the assistance element. When the user decides to work with tasks described by a certain process, the assistant logic interpreter 44 starts to interpret the converted format of the PDL description, thereby giving assistance to the designer trying to accomplish his task. Thus, another name for a PDL description is "assistant logic," since PDL describes the logic of the assistant, i.e., how it works.

During execution of the assistant logic, a number of "shadow" objects are created in the assistant. These shadow objects represent the "real" objects, files, descriptions, etc. which the designer is creating and working with as a part of his task. These shadow objects are used in the assistant logic to keep track of the status of each of the real objects with respect to the process describing the work. By keeping track of the state of the objects, conditions can be checked in order to see if new actions are appropriate and in that case suggest them to the user. These shadow objects are part of the information model described in FIG. 1.

Figure 3:
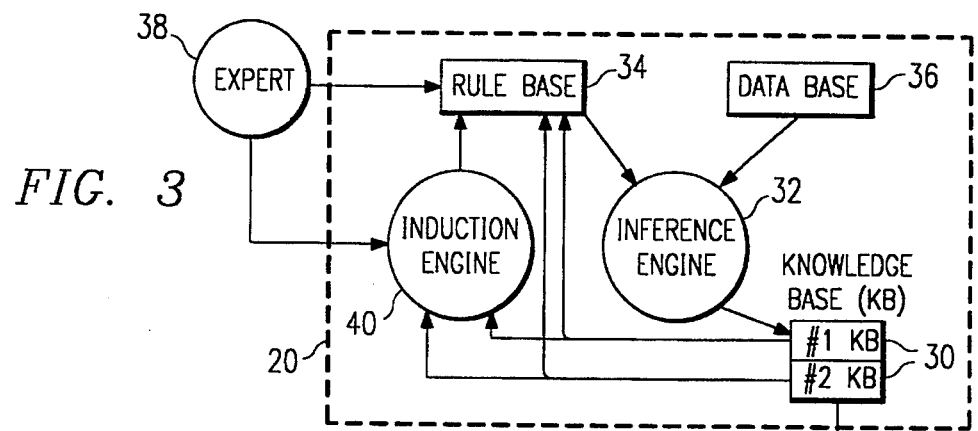
FIG. 3 is a block diagram illustrating the primary components of an expert system as may be employed in the present invention.

Now referring to FIG. 3, there is shown a block diagram illustrating the primary components of an expert system, similar to the expert system 20 of the present invention. The typical expert system relies upon a corpus of knowledge that accumulates during the creation of the system itself. This corpus of knowledge resides within the knowledge base 30 of the expert system 20. Information stored within the knowledge base 30 may be broken down into categorical units and discrete sections of the knowledge base 30. This aspect is shown through the #1KB and the #2KB contained in the knowledge base 30. The knowledge required for proper operation of the support system 8 must be explicit and accessible to the expert system 20.

The general problem solving element of the expert system 20 comprises the inference engine 32. The inference engine 32 invokes rules stored within the rule base 34. The inference engine 32 determines how the rules contained within the rule base 34 apply to the problem at hand and the order in which these rules should be executed. Many of the rules in the expert system 20 take the form of heuristics which consist of simplified approaches to the search for a solution. In operation, the inference engine 32 scans data in the data base 36, matching data with the criteria from the rule base 34. In turn, the heuristic approach relating to the rule base 34 generates information for the knowledge base 30. Initially, the rules employed in the process originate from an expert 38, with no specific order being required for the rules. Further, the information in the knowledge base 30 undergoes real time updating during the operation of the expert system 20.

Alternatively, operation of the expert system 20 may proceed by utilizing the induction engine 40 to formulate rules for the rule base 34. The induction engine 40 operates by deriving general principles applicable to the process from particular information found within the knowledge base 30. The expert 38 can either provide rules directly or give examples which can be converted to rules by the induction engine 40.

Figure 4:
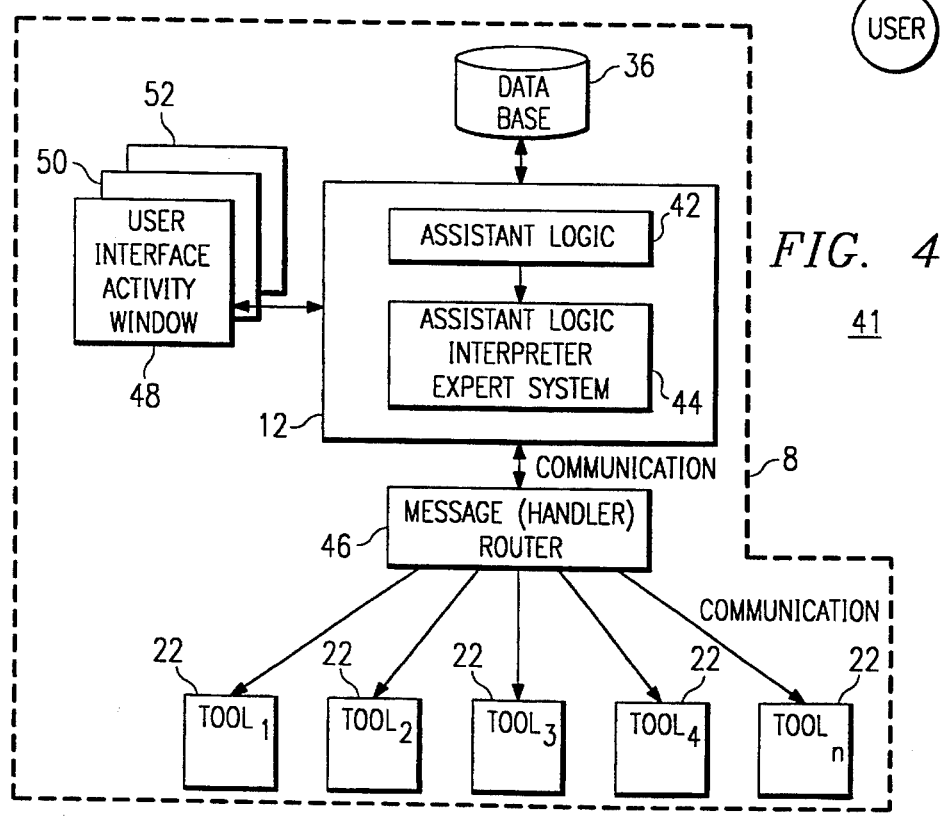
FIG. 4 is a block diagram illustrating the primary components of the support system of the present invention.

Referring next to FIG. 4, there is shown a block diagram of the support system illustrating the component parts thereof in accordance with the teachings of the present invention. Being a computer based system, so as to provide the advantages thereof, the preferred embodiment of the present invention resides in a computer 41 which is adapted to execute pre-established sequences of logic statements (i.e., programs and/or firmware) and to read from and write to memory. Central to the operation of the support system 8 is the assistant 12. The assistant 12 comprises the assistant logic module 42 and the assistant logic interpreter 44. The assistant logic module 42 consists of a converted PDL description as described above, which defines the process and represents the goal to be achieved.

The assistant logic interpreter 44 houses the expert system 20. In one preferred embodiment, the expert system 20 is programmed in ProKappa language as designed by Intellecorp, Inc., 1975 El Camino Real West, Mountain View, Calif. The present invention adds graphics to the supplied ProTalk language for increased operational simplicity. The assistant 12, and specifically the assistant logic interpreter 44, communicate through the message handler 46 with tools in the support system, including but not limited to, compilers and editors. The tool and the tool functions are the basic building blocks in terms of which the process is expressed, and the way through which the process is implemented in the support system. In this way most of the process specific knowledge can be allocated to the PDL description instead of in the tools. Therefore the different tools are easier to reuse in other processes, and the tools do not have to be changed when the process is modified. Also connected to the assistant 12 is the data base 36. The data base 36 both stores information generated or processed by the support system 8 in general as well as provides access for the assistant logic interpreter 44 and the assistant logic 42 to previously stored process information.

In order to increase productivity when using the support system 8, each of the tools 22 operate in parallel with each of the other tools 22 (in different UNIX processes if implemented on a UNIX platform). Each tool interacts with the assistant 12 by exchanging messages regarding the current status of actions being taken by that tool. Thus, many concurrent activities occur within the support system 8, and each of these concurrent activities is monitored and analyzed by the assistant 12.

Still referring to FIG. 4, there is also illustrated the user interface/activity window 48 of the assistant. The user interface 48 communicates to the user 16 the status of the process and provides the user with guidance in performing the activities defined by the process. The user interface comprises the only element of the assistant 12 apparent to the user 16. The expert system 20 in the assistant 12 analyzes the actions of the user 16 (through messages received from the tools or choices made in the assistant user interface) in the context of the current process and generates the proper graphical information for the particular situation.

Within the user interface 48 communications of information is possible using a number of different representations. The information displayed, for example, may take the form of lists, or could take the form of graphical representations as well as flow charts. The numerous interfaces available are illustrated by means of the block 50 representing a first alternative interface and the block 52, representing a second alternative interface. The user has the choice as to which mode of interface is most appropriate with his or her skills and the task at hand.

Figure 5:
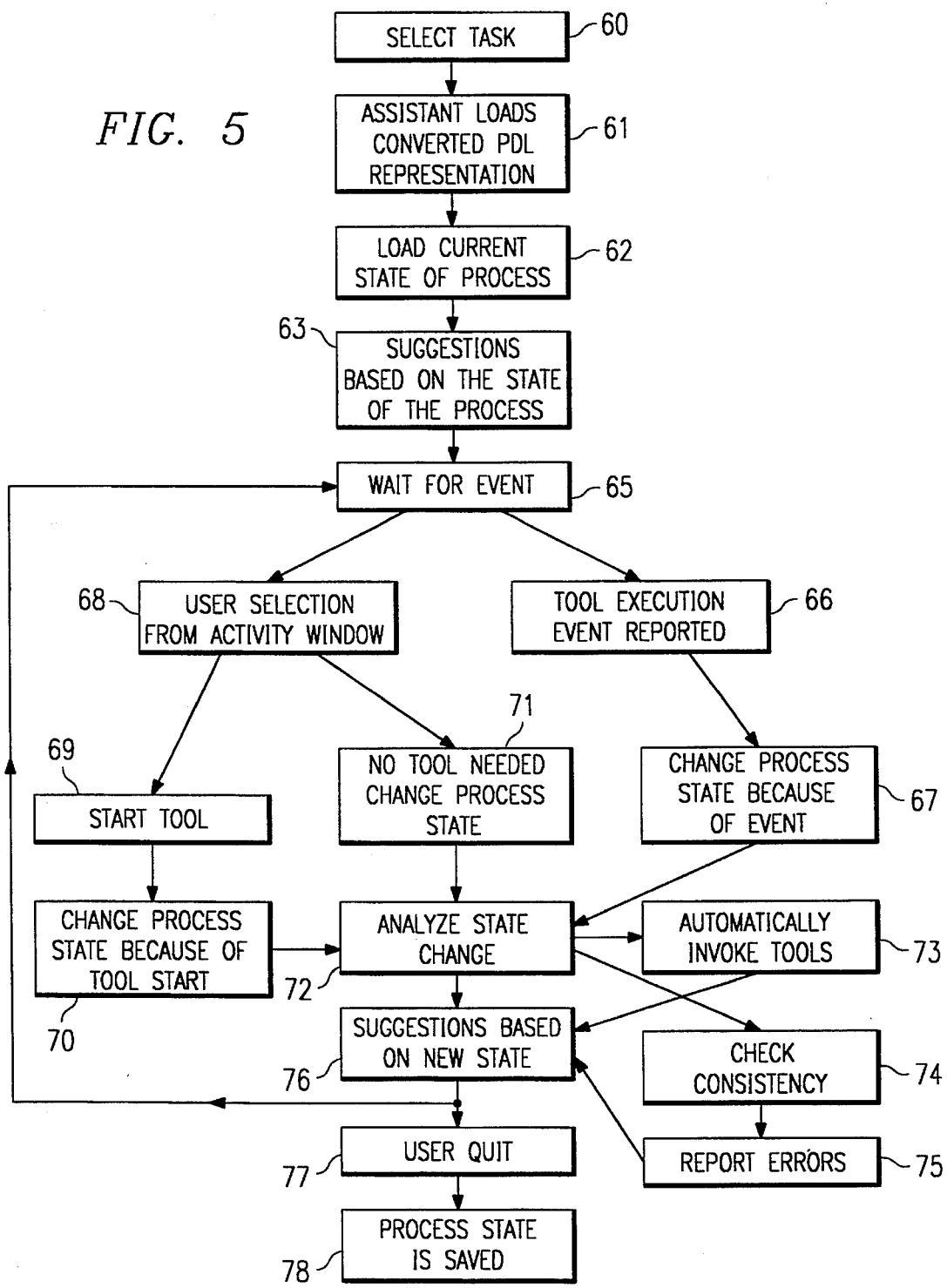
FIG. 5 is a flow diagram wherein the steps preformed in the interactive support of the process are illustrated in sequential order.

Referring now to FIG. 5, there is shown a more detailed flow chart describing the way in which the assistant 12 works in run time, when the assistant logic interpreter 44 is loaded with the process description, as described above. From the flow chart it is apparent that the assistant 12 depends on a number of factors regarding the tools 22 that are part of the support system 8. First, the assistant 12 must be able to start the tools 22 and to invoke tool functions. This is done through a message handler 46 that takes care of communication. Also, the tools must report different events taking place, since most of the tool events have relevance to the state of the process and the achievement of the design goal, such as modifying a file, creating an interface description, or compiling a program. Which events a tool should report is decided when the process description describing the task is designed.

Since a tool can communicate with the assistant 12 no matter where it was started (from the assistant activity window, from a database browser, or from a Unix shell), the system 8 allows the user to start tools by other means than the activity windows 48–52 handled by the assistant 12. The user can also execute different tool functions directly from the tools that are not necessarily shown as suggestions in the activity windows. Therefore, the assistant 12 and the assistant logic 42 must be able to handle events originating from different tools at any time. This is possible since the PDL description, which describes what to do when an event occurs, only refers to the current state of the process, not to the order in which events have occurred (this is possible using the triggering mechanisms of the underlying expert system). Any event, therefore, is interpreted in terms of the state of the process, regardless of if it was related to a suggestion from the assistant 12 or not.

Still referring to FIG. 5, a detailed explanation of the flow shown there follows. Beginning with block 60, the user selects the task that he or she should perform. For example, the task could be the design of a new software product, or taking care of an error report. In block 61, the assistant 12 selects the appropriate PDL description of the particular task (this is done internally and automatically within the assistant). This description has previously been analyzed and converted as described in FIG. 2. Proceeding on to block 62, the current state of the process describing the task is loaded into the assistant 12 from the database 36. This loading is most relevant when the user has previously worked on the task and saved the status of the prior work. In block 63 the assistant 12 makes suggestions on the actions to be taken based upon the current state of the process. The manner in which the suggestions are shown depends upon the user interface employed as described above.

Block 65 describes the assistant 12 waiting for events occurring in the support system 8. The branch to block 66 indicates that a tool reports the result of a function invocation as an event to the assistant 12. In response to the event generated in block 66, block 67 changes the state of the process, since it is derived from the events taking place in the support system 8. If the user had made a selection of one of the assistant's suggestions from within the activity window, block 68 would be active. If the branch from block 68 to block 69 is followed, and the suggestion selected from within the activity window involves executing a tool function, the tool 22 is started (if needed) and the proper function called via the message handler 46. Proceeding on to block 70, the state of the process is changed, reflecting the invocation of the tool function. If, however, the suggestion selected by the user does not involve invoking a tool function, the internal state of the process is changed through the mere selection made by the user. In this case, the user usually indicates that some manual activity has been performed in the process.

After the state change has been effected, in block 72 the assistant 12 deduces the effects of the change. As a result of the analysis conducted in block 72 the assistant may then automatically invoke other tools in block 73. Further, as a result of the analysis in block 72 a consistency check between different information elements may automatically be precipitated in block 74 and the errors found therein would then be reported in block 75. Additionally, the assistant 12 may, as a result of the analysis of block 72, deem automatic tool invocation unnecessary and, instead, generate a new set of suggestions for the user. The new set of suggestions are based upon the new process state created, whereupon the cycle is repeated. If, however, the user wishes to quit that occurs in block 77 and the state of the process is saved in block 78.

Figure 6:
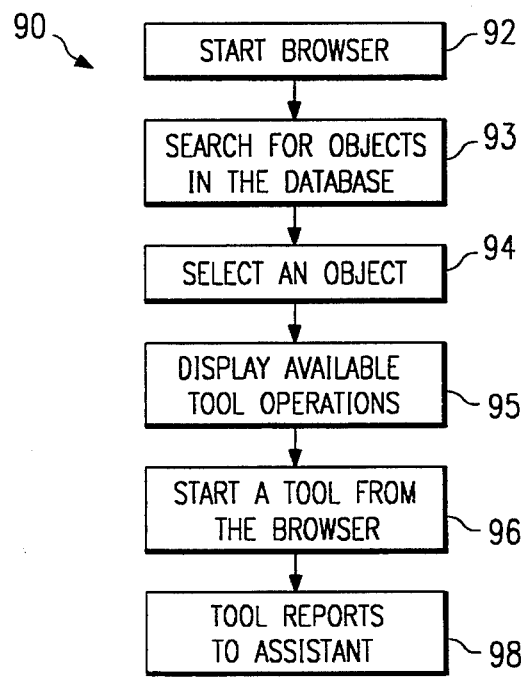
FIG. 6 is a flow diagram of the browser feature of the present invention.

Referring next to FIG. 6, there is illustrated the browser server 90 aspect of the present invention which comprises an independent element of the support system 8. The browser server 90 allows the user 16 to look for objects in the system data base 36 and to select those objects without direction from the assistant 12. The browser server 90 does not provide suggestions to the user. Found objects such as descriptions, flow charts, programs, etc. may be examined through the browser server 90, and tool operations on the object can be initiated. Still referring to FIG. 6, the browser server 90 begins with the start browser block 92. Upon commencement of the browser server 90, the user, at block 93 and 94, can search for and select an object in the system data base 36. When the object is selected a menu can be displayed, at block 95, of available operations for the object. The block 96 starts the tool 22 and this fact is reported to the assistant 12 in block 98. This permits the assistant view of the system to be consistent, in terms of knowing what events are taking place. Thus, the user may interact with the support system 8 in a variety of ways, one of which being through the browser server 90, and still getting support from the assistant 12.

Figure 7:
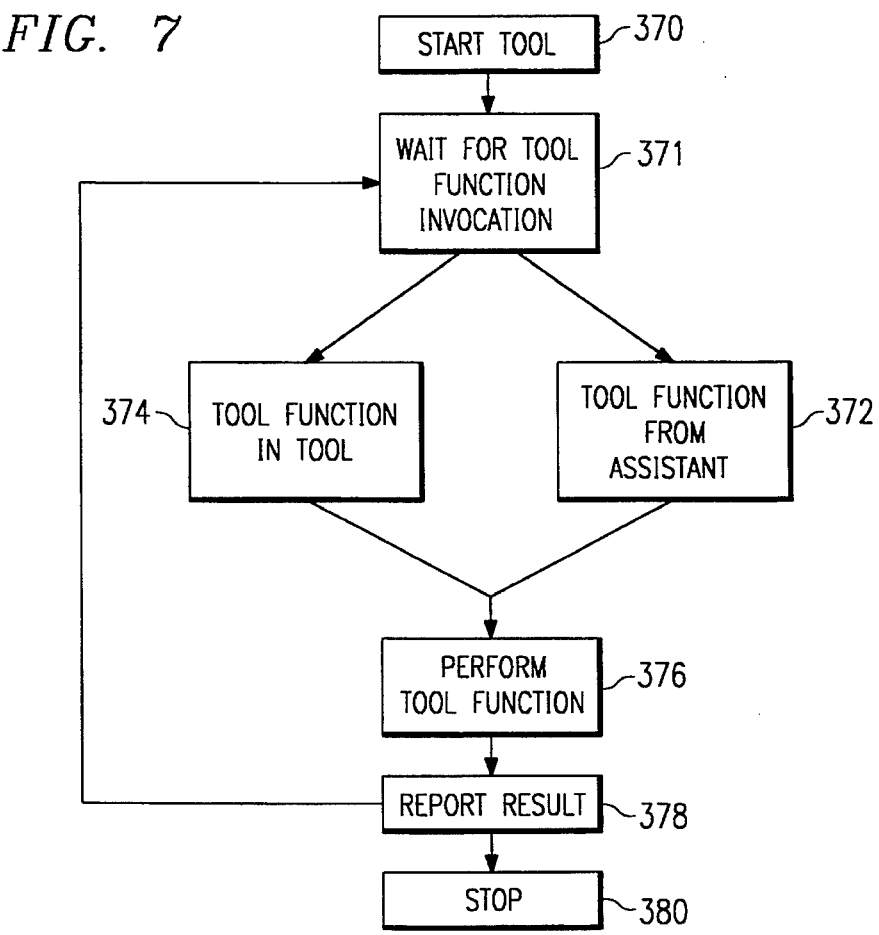
FIG. 7 is a flow diagram illustrating the initiation and operation of the tool functions.

Referring next to FIG. 7, there is shown a flow diagram of tool function invocation. Since the user can initiate the tools 22 without help from the assistant 12, the user can also execute different tool functions that are not necessarily shown as suggestions in the activity window handled by the assistant 12 (as described above in the browser aspect). Thus, the assistant 12 and the assistant logic 42 must be able to handle events originating from various tools at any given time. This is possible because the PDL description, which describes what to do when an event occurs, refers only to the current state of the process, not to the order in which activities have been performed as mentioned above. Any event, therefore, is interpreted in terms of the state of the process regardless of whether or not the assistant forwarded it in terms of a suggestion.

Consequently, for a tool designer to conform to the requirements imposed by the assistant 12, the tool must function in the following manner. First, the tool function is started at block 370, and this fact is reported to the assistant. After the start, the tool can accept an invocation of a tool function in block 371. The tool function is invoked either through the assistant 12 via block 372 or through the tool user interface via block 374. Next, the tool function is performed at block 376, and, if required by the process, the results therefrom are reported to the assistant 12 at block 378. Again, the tool functions relevant to the process (and thus required to be reported to the assistant) are determined during design of the process. The cycle is repeated, and the tool is ready for the next tool function to be initiated from the waiting for invocation block 371, or the tool is stopped at block 380.

Referring next to FIG. 9, there is shown a PDL diagram of an example of a typical process description specifying the assistance given in one of the prototypes of the present invention which illustratively describes the different steps a secretary needs to take when handling a meeting. Since the process description is expressed through graphical symbols, the flow diagram of FIG. 9 employs such graphical symbols in the following discussion. Furthermore, the system 8 converts the graphical flow diagram to a format that can be interpreted by the assistant logic interpreter 44 as described above.

The textual information shown in FIGS. 9–15 is a partial view of the complete content of the flow diagram. Each graphical symbol can have different kinds of textual information attached to it; an informal comment, implicitly or explicitly specified executable code, documentation, parameter specifications, etc. The view presented in FIGS. 9–15 only shows the parameter specifications for the icons in order to simplify the diagrams and render them easier to read. In this view both variables and constants are specified as parameters, with variables being designated by a question mark as the first character thereof. In the graphical editor supporting this language, this view can be changed to any of the other views described previously.

Figure 8:
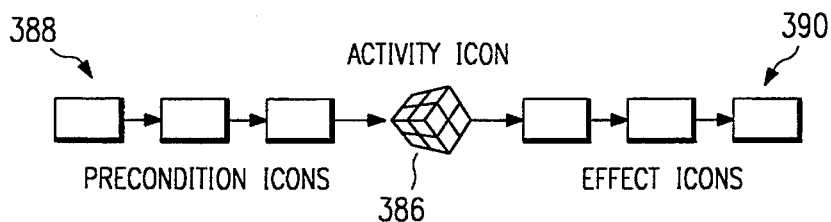
FIG. 8 shows the elements comprising an activity utilized in accordance with the teachings of the present invention.

Referring next to FIG. 8, there is shown further examples of the components of the PDL icons. A basic building block in PDL is the activity construct which describes the conditions and effects of an activity and takes the general structure illustrated in FIG. 8. The activity icon 386 is surrounded on one side by the precondition icons 388. The precondition icons 388 describe the necessary conditions for the activity to be executed. For example, in FIG. 11, the symbols 140, 142, and 144 are all preconditions. The activity icon 386 acts as a reference to the complete construct, i.e., all of the preconditions and effects. The effect icons 390 can represent an operation to be performed, either by the user or automatically through the assistant 12. There also exists a number of different predefined icons representing specific conditions and effects, e.g., menu icons, file icons, clock icons, etc. Predefined executable code, documentation, etc. are attached to those icons, and parameters can be given to the icons. It should be noted that all variables introduced in an activity are local to the activity.

As stated above, shadow objects internal to the assistant are holders of state information. In order to keep track of documents, programs, the different processes, subprocesses, etc. all of them are represented as shadow objects in the assistant 12. These shadow objects are created when the corresponding real objects are created. There exists a specific icon in PDL, the instantiation icon (instantiation in general means creating a particular example from a template, such as a description of a shadow object), that represents the creation of a shadow object. In the case of the instantiation symbol 102 in FIG. 9A, a secretary task is instantiated. The diagram of the secretary task is in general describing a number of possible tasks and many different meetings can be arranged using this description. When executing the description in order to assist a user in arranging a particular meeting, this particular meeting arrangement task must have a representation, i.e., a shadow object. The instantiation symbol 102 represents the creation of such an instance, which then can hold status information about this particular meeting arrangement task, and can be referred to from other parts of the diagram.

Figure 9A:
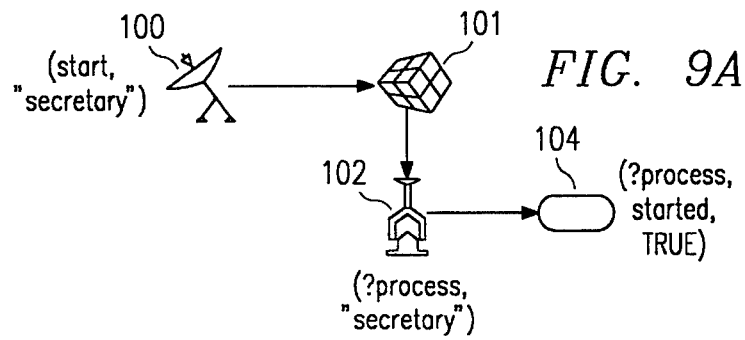
FIGS. 9A–9C are flow diagrams of different parts of the method of processing data in accordance with the teachings of the present invention.
Figure 9B:
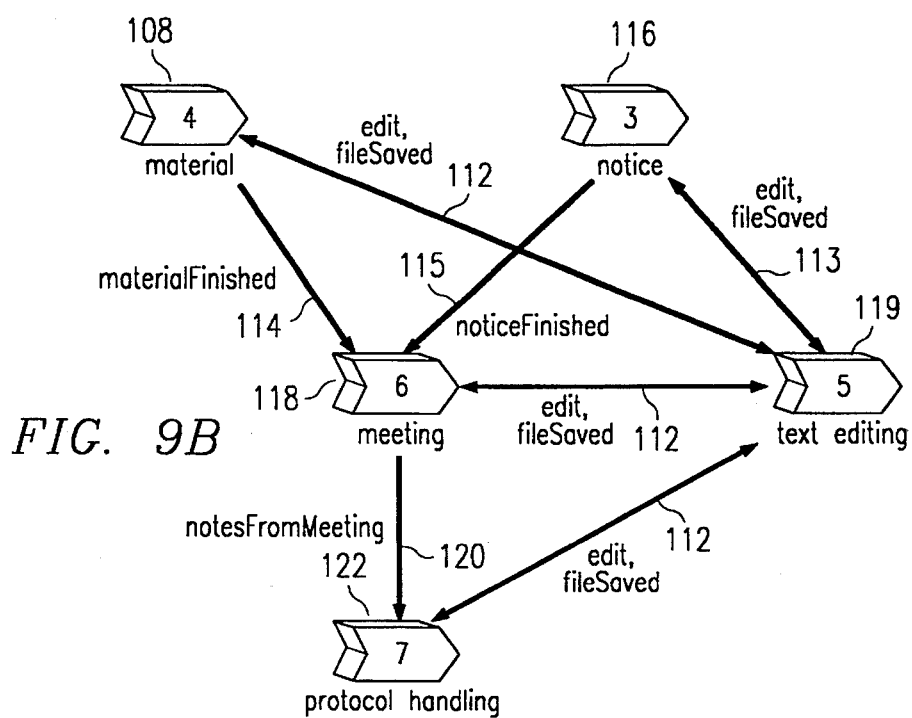
Figure 9C:
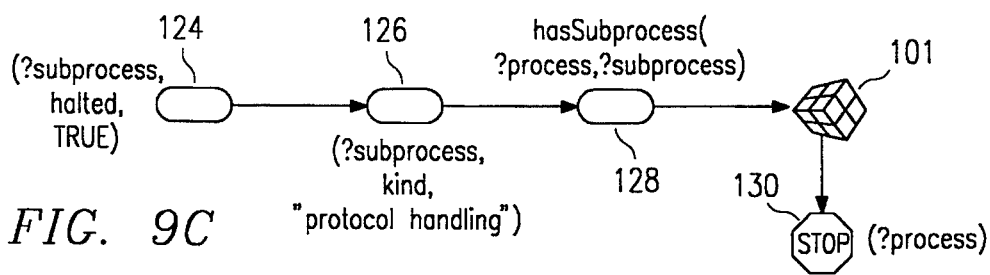

Referring next to the flow diagrams of FIGS. 9A–9C, the process described relates to the tasks required of a secretary to arrange a business meeting or the like. The diagrams show different aspects of the process. The uppermost part, FIG. 9A, is a descriptive illustration of the start conditions of the process while the middle part FIG. 9B, describes the breakdown of the process into subprocesses. The secretary process, as is possible for any other process handled by the support system 8, can contain several subprocesses. The subprocesses illustrated in FIG. 9B are the material subprocess 108, the notice subprocess 116, the meeting subprocess 118, the text editing subprocess 119, and the protocol handling subprocess 122. The material subprocess 108 describes how to collect the materials needed for the particular meeting while the notice subprocess 116 describes how to send information to the attendees of the meeting. The meeting subprocess 118 describes how to conduct the meeting and the text editing subprocess 119 describes how to enter text (for example, what tool to use). The protocol handling subprocess 122 describes how to handle the subtask of writing a protocol. The lower part, FIG. 9C, describes the stop condition of the process. It should also be understood that there exist other views of the process (interface view, activity view, etc.) which are not shown in FIGS. 9A–9C.

Each of the subprocesses begins automatically once the criteria for instantiation have been satisfied, which for example, could be that a service which the process offers has been requested (such as text input from some other subprocess). A sequence of processors or subprocesses can also be described, and in this case the event important to the task of a succeeding process is the event "finished" reported by the preceding process. The transfer of information diagrammatically indicated by arrows such as the "edit" arrow 112 and the "material finished" arrow 114 within FIG. 9B, further illustrates the exchange of events relevant to the subprocesses describing concurrent tasks. The arrows are of no semantic importance in the diagram and are only an informal way of describing information flow. The real exchange of information is handled by the inference engine 32 of the underlying expert system 20 and is described in detail in the corresponding subprocesses.

The icon 100, represents the fact that the support system 8 begins its operation by receiving an external event that initiates the process (corresponding, for example, to the user creating a new meeting arrangement task); the parameters of the event is the name ("start") and the kind of process to start ("secretary"). Instantiation occurs at icon 102. The symbol 104 represents the setting of initial values associated with the secretary process, and is described as a state change of the process (the aspect "started" of the process is set to true). The activity icon 101 represents the complete activity, as described above.

Referring next to the different arrows shown in FIG. 9B, the edit arrow 112 indicates the material subprocess 108 referring to a service handled by another subprocess. In this case, from within the material subprocess 108 the text editing subprocess 119 is utilized. The text editing subprocess 119 describes how to use a text editor which can be performed in parallel and concurrently with activities described by other subprocesses in the system. Once the material subprocess 108 and the notice subprocess 116 have completed their respective tasks the finished events 114 and 115 occur. The "notes from meeting" event 120 from the meeting 118 indicates that data from the meeting is available. The meeting data is utilized by protocol handling subprocess 122 which represents the postmeeting work which must be done. The edit event 112 leads to further text editing by text editing subprocess 119. Thus, FIG. 9B illustrates event exchanges between subprocesses describing tasks that can be executed in parallel. The tasks of the material subprocess 108 and the notice subprocess 116, for example, can occur in parallel, as is evidenced by the lack of any synchronizing events being exchanged between them.

Referring now to FIG. 9C, in icon 124, the condition describes the state where the halted aspect in any subprocess is true. In icon 126 the condition states that such a process must be of kind "protocol handling" to be of interest for this activity. In icon 128 the secretary process (identified by process) is found which owns the halted subprocess. Finally, in icon 130 the secretary process is halted.

Figure 10:
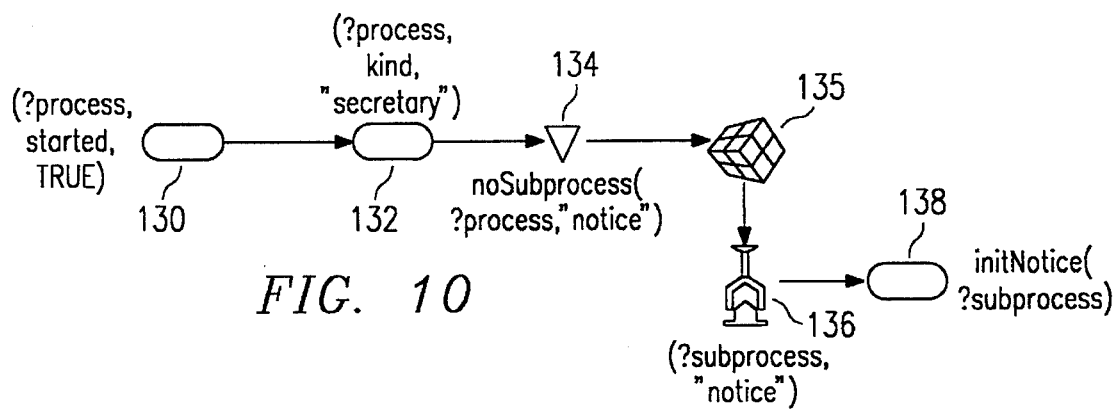
FIG. 10 is a flow diagram further illustrating the method of processing data in accordance with the teachings of the present invention.

Referring next to FIG. 10, there is also illustrated the method for processing data pursuant to the teachings of the present invention. This represents an instantiation of the notice subprocess 116 of FIG. 9. Thus, the secretary task must have been started, which is represented by the symbols 130 and 132 (the started aspect is true and the kind of process is "secretary"). When the precondition is true, the activity 135 is begun and the instantiation of the notice subprocess 116 is effected in symbol 136 (the reference to this instance is "subprocess"). Then at the symbol 138, the initial values of the notice subprocess are recorded as state information.

Figure 11:
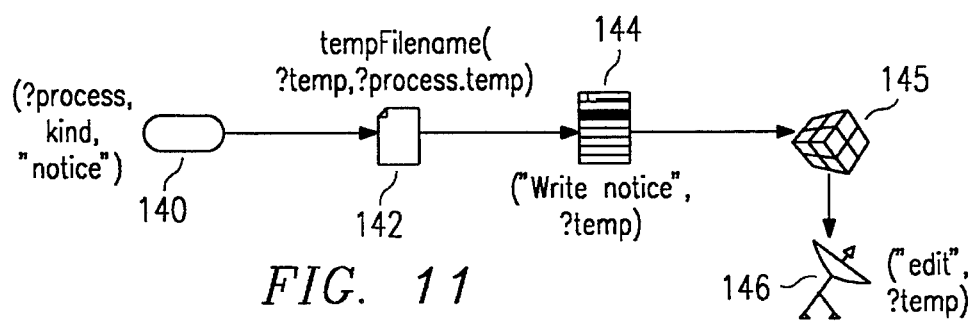
FIG. 11 is a flow diagram further illustrating the usage of graphical symbols within the method of processing data in accordance with the teachings of the present invention.

Referring next to FIG. 11, there is illustrated, in further detail, the method for processing data pursuant to the teachings of the present invention and, in particular, an edit activity 145. The mechanisms of the underlying expert system will detect when the preconditions of the activity are true. For the edit activity 145 to be possible, the symbol 140 indicates that the notice subprocess must be started. The symbol 142 indicates that data requiring temporary file storage will be generated through the present activity and, therefore, a temporary file name must be known in order to store the information (the way in which this is done is described in the code section of the symbol which is not shown here). Next, the menu 144 functions as the description of interaction with the user. In PDL language the menu symbol abstracts the way in which the assistant 12 interacts with the user, for example, activity lists can be presented to the user. First, the symbol represents the text (in this particular case "write notice") that is presented to the user. The text presented describes an activity that can or should be performed by the user. The menu 144 also implies an object, e.g., a file, code, etc., on which the activity is performed (in this case the temporary file represented by ?temp). Further, the menu 144 represents a condition. Before the user explicitly selects the activity in the activity list, this condition is always false, and the effects, such as execution of a tool function or a state change, are not effected. When the user selects the activity in the user interface, the condition becomes true and the effects are executed. In this case, when the user selects the write notice choice in the activity list, an edit event is sent (corresponding to arrow 112 in FIG. 9B) in symbol 146 to another subprocess requesting an edit task. This request is handled by the text editing subprocess (not shown here), where the editor is started and the user then uses the editor to write notice of the meeting.

Figure 12:
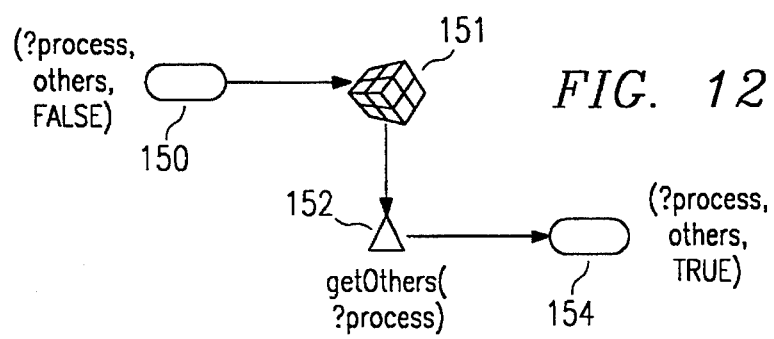
FIG. 12 is a flow diagram illustrating a method of data retrieval utilizing the teachings of the present invention.

Referring next to FIG. 12, there is shown further details of the data processing of the present invention. The description of the notice subprocess 116 continues with an activity 151 comprising the retrieval of data pertaining to who is going to attend the meeting. The symbol 150 indicates that information must be retrieved if the state of the "others" aspect of the process is false. The symbol 152 could result in a menu window which requests entry of those expected to attend which would then be described in the code view of the icon 152, using basic windowing primitives supported by the system. The symbol 154 represents the state of the notice subprocess 116 and symbolizes that retrieval of the names has occurred (the state of the "others" aspect is now true). This activity is triggered by the activity described below in connection with FIG. 13.

Figure 13:
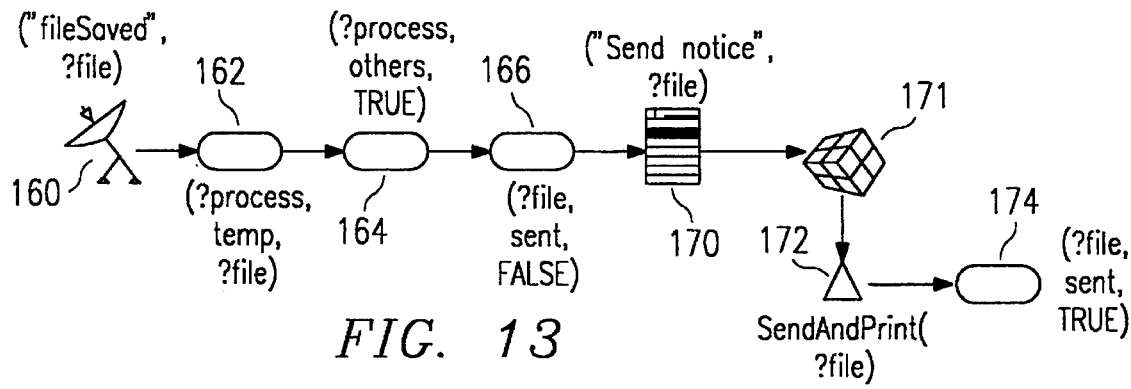
FIG. 13 is a flow diagram further illustrating the method of processing data, and in particular, teaches execution of an activity pursuant to the principles of the present invention.

Referring now to FIG. 13, the description of the notice process continues. Beginning with the symbol 160, an event from another subprocess is detected in which a file has been saved. This information originates from the text editing subprocess 119. At the symbol 162, the system performs a check to verify that the file saved is the same file as referred to in the temporary filename 142 (this is part of the state information of the process). The system next checks whether the next condition has been satisfied, i.e., whether all other attendees have been accounted for, which occurs at symbol 164. If this is not true, the activity of FIG. 12 is triggered in order to get the attendees. Here the goal driven aspect of the underlying expert system is used, i.e., if a condition is not fulfilled and there exists an activity the effects of which will satisfy the condition, this activity will be performed. At the symbol 166, the system ascertains whether notices have previously been sent to the attendees (this is recorded as state information on the ?file object). This illustrates the non-sequential character of the overall support system 8. With each of the processes and subprocess operating in parallel fashion and concurrently, the system must perform checks to assure itself that work does not get repeated, and thereby result in erroneous results, in decreased performance and slower processing capabilities of the system. Thus, because only one notice of the meeting is required the symbol 166 performs the check. In satisfying the final condition, the menu 170 provides the user 16 with the choice of selecting the "send notice" activity 171. At symbol 172, the assistant of the present invention sends the notice and prints it. The symbol 172 symbolizes an operation which loads, mails, and prints the notice for transmittal to all necessary parties (which could be achieved by using the UNIX mail and print services which are again described in the code view of the icon). The symbol 174 records the state information that the notice has been sent on the ?file object, and thereby this activity cannot be repeated.

Figure 14:
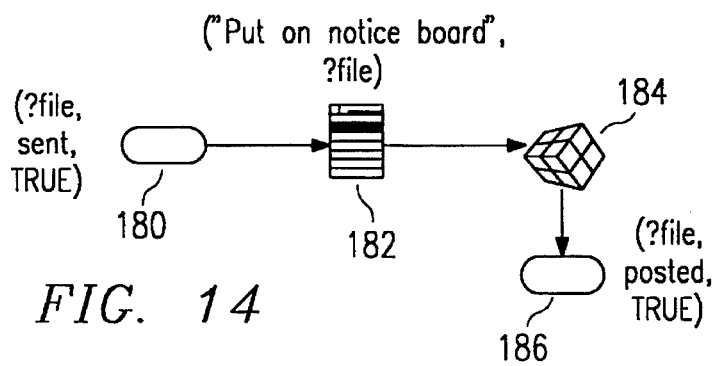
FIG. 14 is a flow diagram further illustrating, in diagrammatic form, execution of an activity not supported by a tool in accordance with the teachings of the present invention.
Figure 15:
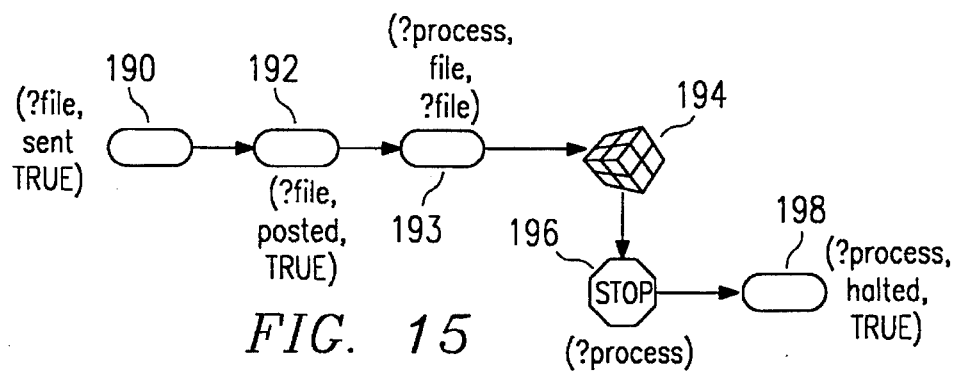
FIG. 15 is a flow diagram illustrating completion of the data processing subprocess.

Referring now to FIG. 14, elements of the notice subprocess are further detailed in diagrammatic form. The symbol 180 indicates the condition that a "hard copy" of the notice must already have been created; in other words, the notice was printed (this occurs in activity 171 above). The menu 182, tells the user that the notice should be placed on the notice board in the desired location. The activity 184 in this case represents an activity which the support system 8 cannot assist in by supplying tools; rather, the user must physically place the notice himself or herself. Therefore the icon 186 indicates that only an internal state change takes place in this activity and no external tool is involved. Finally, referring to FIG. 15, the activity 194 comprising completion of the notice subprocess is illustrated therein. The conditions 190 and 192 are true when the notice has been sent and posted. The symbol 196 stops the process, and the symbol 198 records this state change. It also operates an event for processes interested in this fact due to the triggering mechanisms of the expert system. Referring back to FIG. 9B, it is seen that the notice subprocess 116 leads to the meeting 118, when the finished arrow 114 is followed. Thus, at the occurrence of the event 198 the meeting 118 would be instantiated and the necessary steps and tasks required to complete the meeting would then take place.

A symbol identifier description is attached hereto as Appendix A. The description defines the graphical symbols utilized by the support system 8 as illustrated in FIGS. 8–15. Also attached hereto, as Appendices B and C are detailed program listings for carrying out the data processing steps for a different prototype designed according to the teachings described in this application. More particularly, Appendices B and C are program listings illustrating the manner in which code is generated in ProKappa language by the PDL graphical language for execution within an expert system 20 of the type used in the present invention. While the exemplary processes defined by the program listings of Appendices B and C are entirely different from the example of the secretary process shown in FIGS. 8–15, the listings are instructive to illustrate how the PDL definition of a process is reduced to executable code.

In FIGS. 8–15 a number of different activities have been shown. These are internally non-sequential, since the conditions for each of them are tested for validity no matter which other activities have been performed. In this way a maximum of flexibility can be achieved for the end user. Through the mechanisms described above, the support for different tasks can be created and modified without having to change the different tools being used. The formal description acts as a control program on top of a number of components, describing the logic that is needed in order to make single tools act in an integrated way.

Thus, there has been described and illustrated herein a method and apparatus for system development support. Those skilled in the art, however, will recognize that many modifications and variations besides those specifically mentioned may be made in the techniques described herein without departing substantially from the concept of the present invention. Accordingly, it should be clearly understood that the form of the invention as described herein is exemplary only and is not intended as a limitation on the scope of the invention.

APPENDIX A

1 Symbol identifier description

1.1 Activities

A central concept in PDL is the activity. An activity is represented by a cube.

Conditions are connected to the activity to describe when it can be performed. Effects are connected to the activity to described what is achieved (how it effects the rest of the world).

1.2 Conditions

A general condition is represented by a triangle with the top pointing downwards. A condition is connected to an activity through a flow arrow.

More than one condition can be connected to an activity. When one condition must be valid before the next can be tested, it is expressed as:

The condition furthest away from the activity is tested first.

To be able to express something more specific than a general condition, a number of specific condition icons exists:

 Input (a general object) must exist.

 Input (a document or file) must exist in a certain status (described by parameters), for example a certain revision. This is a specialization of the previous symbol.

 Describes a state, for example an attribute in an object must have a certain value (proc.state==validation or obj.a1>obj.a2).

 Describes a time expression, for example that something should happen at a certain time (now.date>=1991-10-15).

 Describes an activity that should be presented to the user in the user interface. The corresponding activity is executed when the user selects the activity in the user interface. This condition should be placed last in a chain of conditions, so as to make certain that the rest of the conditions really are valid when the activity is performed.

 Describes a condition on an incoming signal (parameters can be attached to it).

1.3 Effects

A general effect is represented by a triangle with its base downwards.

An activity is connected to an effect through a flow arrow.

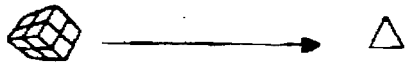

An activity can be connected to many effects. If one effect must be performed before another, it is expressed as:

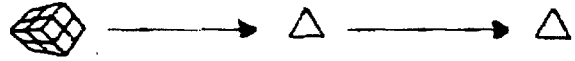

The effects closest to the activity is performed first. Also more complex effects can be described:

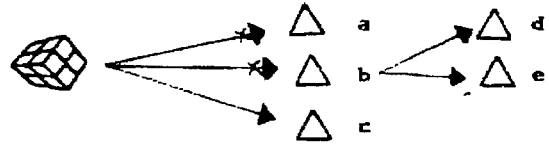

The figure implies the following effects:[1]

(a or (b and (d and e))) and c

To express something more specific than a general effect, there exists a number of specific effect symbols:

☐ A general object is created as output.

---

[1] PDL has a statement form and semantics that is reminiscent of Prolog, which means that each statement (effect) either succeeds or fails. This can be mapped to the flow relations of the effects. "Or" in this case is interpreted as all branches are tested until one succeeds.

 A document or file is created as output or receives a new status (for example a new revision). This is a specialization of the previous symbol.

 Describes a state change (for example proc.state=validation).

 Describes a time expression (for example wait for a certain time or timeout on an asynchronous signal sending).

 Describes an outgoing signal. The signal can either be broadcasted or be directed to a specific receiver.

 Describes the creation of a shadow object (could represent a process or an object describing a real object such as a file).

 Describes the removal of an object (usable when a process is terminated).

2   Syntax

1   <process diagram>::=
    <process area>

2   <generic condition symbol>::=

3   <specific condition symbol>::=

4   <generic effect symbol>::=

5   <specific effect symbol>::=

6   \<and association symbol\>

———————▶

7   \<or association symbol\>

——————⨯▶

8   \<not association symbol\>

—————┼▶

9   \<control association symbol\>

━━━━━━▶

10  \<inherit association symbol\>

—————▷

```
                                APPENDIX B
/* ------------------------------------------------------------------- *
    Generated by PDL for ProKappa
       at: May-20-1991 12:49:30
       from: `/tmp_mnt/usr/local/sds/pgm/css/assistent/bin/eslambada'
 * ------------------------------------------------------------------- */ include <prk/lib.pth>

/* ------------------------------------------------------------------- *
    PROCESS:   `flow design'
       type:      process with process icon
       on page:   003 `design'
       ruleset:   flowDesign PRE-CONDITIONS:
    ACTIVITY:
       flow design
    POST-CONDITIONS:
 * ------------------------------------------------------------------- */

/* ------------------------------------------------------------------- *
    ACTIVITY:  `flow design'
       type:      activity with stamp icon
       on page:   004 `flow design'
       refined:   no
       rule:      flowDesign_flowDesign_1
       ruleset:   flowDesign PRE-CONDITIONS:
    ACTIVITY:
       flow design
    POST-CONDITIONS:
 * ------------------------------------------------------------------- */

/* no code available*/

/* ------------------------------------------------------------------- *
    ACTIVITY:  `flow design rules'
       type:      activity with decomposition icon
       on page:   004 `flow design'
       refined:   yes
       rule:      flowDesignRules_flowDesign_2
       ruleset:   flowDesign PRE-CONDITIONS:
    ACTIVITY:
       flow design rules
    POST-CONDITIONS:
 * ------------------------------------------------------------------- */

/* no code available*/

/* ------------------------------------------------------------------- *
    ACTIVITY:  `unnamedActivity'
       type:      activity with box icon
       on page:   012 `flow design rules'
       refined:   no
       rule:      unnamedActivity_flowDesign_3
```

```
    ruleset:    flowDesign

PRE-CONDITIONS:
    instance of flow design
    activities
ACTIVITY:
POST-CONDITIONS:
* ------------------------------------------------------------- */
fcrule unnamedActivity_flowDesign_3 in flowDesign (
if:
    /* --- precond with precondition icon */
        ?process == instanceof NonToolProcessObj;
        ?process.Type == flowDesign;
    /* --- precond with menu icon */
        ?process.presentAlternative("activities",flowDesign);
        ?process.Selected == TRUE;
        ?process.SelectedActivity == "activities";
then:
    /* --- activity with box icon */
}
/* -------------------------------------------------------------- *
    ACTIVITY:   `unnamedActivity'
        type:       activity with state change icon
        on page:    012 `flow design rules'
        refined:    no
        rule:       unnamedActivity_flowDesign_4
        ruleset:    flowDesign PRE-CONDITIONS:
        SavedTime > TouchedTime
        Working
        Name != "unnamed"
        "done for now"
    ACTIVITY:
    POST-CONDITIONS:
        TemporarlyFinished
* -------------------------------------------------------------- */ fcrule unnamedActivity_flowDesign_4 in flowDesign (
if:
    /* --- precond with precondition icon */
        ?x.SavedTime > ?x.TouchedTime;
    /* --- precond with precondition icon */
        ?x.Status == Working;
    /* --- precond with precondition icon */
        ?nm == ?x.Name;   /* Forward chaining */
        ?nm != "unnamed";
    /* --- precond with menu icon */
        ?x.presentAlternative("done for now",ESed);
        ?x.Selected == TRUE;
        ?x.ActivitySelected = "done for now";
then:
    /* --- activity with state change icon */
    /* --- postcond with transmitter icon */
        broker.changeState(?x,Status,TemporarlyFinished);
}
/* -------------------------------------------------------------- *
    ACTIVITY:   `unnamedActivity'
        type:       activity with state change icon
```

```
        on page:    012 `flow design rules'
        refined:    no
        rule:       unnamedActivity_flowDesign_5
        ruleset:    flowDesign PRE-CONDITIONS:
        SavedTime > TouchedTime
        Working
        Name = "unnamed"
        "name flow"
    ACTIVITY:
    POST-CONDITIONS:

Print "Choose Save As
        option in the editor"
*   ------------------------------------------------------------------- */ fcrule unnamedActivity_flowDesign_5 in flowDesign (
if:
    /* --- precond with precondition icon */
        ?x.SavedTime > ?x.TouchedTime;
    /* --- precond with precondition icon */
        ?x.Status == Working;
    /* --- precond with precondition icon */
        ?x.Name == "unnamed";
    /* --- precond with menu icon */
        ?x.presentAlternative("name flow",ESed);
        ?x.Selected == TRUE;
        ?x.ActivitySelected = "name flow";
then:
    /* --- activity with state change icon */
    /* --- postcond with transmitter icon */
        /*displayMgr.presentInfo("choose the Save As option in the editor");*/
        Print("choose the Save As option in the editor");
}
/* -------------------------------------------------------------------- *
    ACTIVITY:   `unnamedActivity'
        type:       activity with state change icon
        on page:    012 `flow design rules'
        refined:    no
        rule:       unnamedActivity_flowDesign_6
        ruleset:    flowDesign PRE-CONDITIONS:
        TranslationError
        "correct errors"
    ACTIVITY:
    POST-CONDITIONS:
        request edit
*   ------------------------------------------------------------------- */ fcrule unnamedActivity_flowDesign_6 in flowDesign (
if:
    /* --- precond with precondition icon */
        ?x.TranslationStatus == TranslationError;
    /* --- precond with menu icon */
        ?x.presentAlternative("correct errors",ESed);
        ?x.Selected == TRUE;
        ?x.SelectedActivity == "correct errors";
```

```
then:
    /* --- activity with state change icon */
    /* --- postcond with transmitter icon */
    broker.requestService(?x.ESed,edit);
}
/* ------------------------------------------------------------- *
    ACTIVITY:   `flow design rules 2'
        type:       connector with mooring icon
        on page:    012 `flow design rules'
        refined:    yes
        rule:       flowDesignRules2_flowDesign_7
        ruleset:    flowDesign PRE-CONDITIONS:
    ACTIVITY:
        flow design rules 2
    POST-CONDITIONS:
 * ------------------------------------------------------------- */

/* no code available*/

/* ------------------------------------------------------------- *
    ACTIVITY:   `unnamedActivity'
        type:       activity with state change icon
        on page:    013 `flow design rules 2'
        refined:    no
        rule:       unnamedActivity_flowDesign_8
        ruleset:    flowDesign PRE-CONDITIONS:
        Working
        not in editor
        "continue work"
    ACTIVITY:
    POST-CONDITIONS:
        request edit
 * ------------------------------------------------------------- */ fcrule unnamedActivity_flowDesign_8 in flowDesign {
if:
    /* --- precond with precondition icon */
    ?x.Status == Working;
    /* --- precond with precondition icon */
    ?processes == all ?x.ProcessList;
    for ?process inlist ?processes;
        never ?process.Type == editor;
    /* --- precond with menu icon */
    ?x.presentAlternative("continue work",ESed);
    ?x.Selected == TRUE;
    ?x.SelectedActivity == "continue work";

then:
    /* --- activity with state change icon */
    /* --- postcond with transmitter icon */
    broker.requestService(?x,ESed,edit);
}
/* ------------------------------------------------------------- *
    ACTIVITY:   `unnamedActivity'
        type:       activity with state change icon
```

```
        on page:    013 `flow design rules 2'
        refined:    no
        rule:       unnamedActivity_flowDesign_9
        ruleset:    flowDesign PRE-CONDITIONS:
        ESed process
        no files loaded
        "create file"
    ACTIVITY:
    POST-CONDITIONS:
        request createFile
* ------------------------------------------------------------- */ fcrule unnamedActivity_flowDesign_9 in flowDesign {
if:
    /* --- precond with precondition icon */
        ?x == instanceof ToolProcessObj;
        ?x.Name == ESed;
    /* --- precond with precondition icon */
        ?objectlist == all ?x.ObjectSet;
        ?objectlist == `();
    /* --- precond with menu icon */
        ?x.presentAlternative("create file",ESed);

?x.Selected == TRUE;
        ?x.SelectedActivity == "create file";
then:
    /* --- activity with state change icon */
    /* --- postcond with transmitter icon */
        broker.requestService(?x,ESed,createFile);
}
/* -------------------------------------------------------------- *
    ACTIVITY:   `unnamedActivity'
        type:       activity with state change icon
        on page:    013 `flow design rules 2'
        refined:    no
        rule:       unnamedActivity_flowDesign_10
        ruleset:    flowDesign PRE-CONDITIONS:
        ChangedTime > SavedTime
        Working
        "save changes"
    ACTIVITY:
    POST-CONDITIONS:
        request save
* -------------------------------------------------------------- */ fcrule unnamedActivity_flowDesign_10 in flowDesign {
if:
    /* --- precond with precondition icon */
        ?x.ChangedTime > ?x.SavedTime;
    /* --- precond with precondition icon */
        ?x.Status == Working;
    /* --- precond with menu icon */
        ?x.presentAlternative("save changes",ESed);
        ?x.Selected == TRUE;
        ?x.ActivitySelected = "save changes";
```

```
then:
    /* --- activity with state change icon */
    /* --- postcond with transmitter icon */
        broker.requestService(?x,BSed,save);
}
/* ------------------------------------------------------------------ *
    ACTIVITY:   `flow design rules 3'
        type:       connector with mooring icon
        on page:    013 `flow design rules 2'
        refined:    yes
        rule:       flowDesignRules3_flowDesign_11
        ruleset:    flowDesign PRE-CONDITIONS:
    ACTIVITY:
        flow design rules 3
    POST-CONDITIONS:
 * ------------------------------------------------------------------ */

/* no code available*/

/* ------------------------------------------------------------------ *
    ACTIVITY:   `unnamedActivity'
        type:       activity with state change icon
        on page:    014 `flow design rules 3'
        refined:    no
        rule:       unnamedActivity_flowDesign_12
        ruleset:    flowDesign

PRE-CONDITIONS:

!Translating,
        !CorrectlyTranslated
        SemanticallyModified
        TemporarlyFinished
        TouchedTime >
        TranslateTime
        "translate"
    ACTIVITY:
    POST-CONDITIONS:
        request translate
 * ------------------------------------------------------------------ */ fcrule unnamedActivity_flowDesign_12 in flowDesign {
if:
    /* --- precond with precondition icon */
        ?ts == ?x.TranslationStatus;Print(11);
        C:PrkFindListElmt(`(NotTranslated, Translating, CorrectlyTranslated),?ts)  !=
    /* --- precond with precondition icon */
        ?x.ChangedStatus == SemanticallyModified;Print(13);
    /* --- precond with precondition icon */
        ?x.Status == TemporarlyFinished;Print(14);
    /* --- precond with precondition icon */
        ?x.TouchedTime > ?x.TranslationTime;Print(15);
    /* --- precond with menu icon */
        ?x.presentAlternative("translate",ESed);
        ?x.Selected == TRUE;
        ?x.SelectedActivity == "translate";
then:
```

```
    /* --- activity with state change icon */
    /* --- postcond with transmitter icon */
       broker.requestService(?x.ESed,edit);
}
/* --------------------------------------------------------------------- *
    ACTIVITY:    `unnamedActivity'
       type:       activity with state change icon
       on page:    014 `flow design rules 3'
       refined:    no
       rule:       unnamedActivity_flowDesign_13
       ruleset:    flowDesign PRE-CONDITIONS:
       ]UnTranslated
       SemanticallyModified,
       CosmeticallyModified
       TemporarlyFinished
       TouchedTime >
       TranslateTime
       "translate"
    ACTIVITY:
    POST-CONDITIONS:
       request translate
 * --------------------------------------------------------------------- */ fcrule unnamedActivity_flowDesign_13 in flowDesign {
if:
    /* --- precond with precondition icon */
       ?x.TranslationStatus == NotTranslated;Print(21);
    /* --- precond with precondition icon */
       ?ChangedStatus == ?x.ChangedStatus; Print(22);
       or {
       ?ChangedStatus == SemanticallyModified;Print(23);
       ?ChangedStatus == CosmeticallyModified;}Print(24);
    /* --- precond with precondition icon */
       ?x.Status == TemporarlyFinished;Print(25);
    /* --- precond with precondition icon */

?x.TouchedTime > ?x.TranslationTime;Print(26);
    /* --- precond with menu icon */
       ?x.presentAlternative("translate",ESed);
       ?x.Selected == TRUE;
       ?x.SelectedActivity == "translate";
then:
    /* --- activity with state change icon */
    /* --- postcond with transmitter icon */
       broker.requestService(?x.ESed,edit);
}
```

APPENDIX C

```
/* ------------------------------------------------------------ *
   Generated by PDL for ProKappa
      at: May-20-1991 12:49:37
      from: '/tmp_mnt/usr/local/sds/pgm/css/assistent/bin/eslambada'
 * ------------------------------------------------------------ */ include <prk/lib.pth>

/* ------------------------------------------------------------ *
   PROCESS: `ESed'
      type:    process with process icon
      on page: 004 `flow design'
      ruleset: ESed PRE-CONDITIONS:
   ACTIVITY:
      ESed
   POST-CONDITIONS:
 * ------------------------------------------------------------ */

/* ------------------------------------------------------------ *
   ACTIVITY: `ESed'
      type:    activity with stamp icon
      on page: 005 `ESed1'
      refined: no
      rule:    ESed_ESed_1
      ruleset: ESed PRE-CONDITIONS:
   ACTIVITY:
      ESed
   POST-CONDITIONS:
 * ------------------------------------------------------------ */

/* no code available*/

/* ------------------------------------------------------------ *
   ACTIVITY: `shadow object'
      type:    activity with stamp icon
      on page: 005 `ESed1'
      refined: no
      rule:    shadowObject_ESed_2
      ruleset: ESed PRE-CONDITIONS:
      objectCreated
      find flow
      `shadow object exists
   ACTIVITY:
      shadow object
   POST-CONDITIONS:
      get initial values
      ChangeStatus,
      Status
      link symbol
 * ------------------------------------------------------------ */
fcrule shadowObject_ESed_2 in ESed {
```

```
if:
    /* --- precond with receiver icon */
        ?msg.Sender == ESed;
        ?msg.MsgName == objectCreated;
    /* --- precond with precondition icon */
        ?DbId = ?msg.formDbId(0);
        ?flow == instanceof EslObj;
        ?flow.DbId == ?DbId;
    /* --- precond with precondition icon */
        for ?cpp inlist all ?flow.EMSet;
            never ?cpp.Name == ListNth(?msg.Parameters,4);
then:
    /* --- activity with stamp icon */
        ?newcpp = MakeAnonymousInstance(assistent,CppCodeObj);
    /* --- postcond with postcondition icon */
        ?newcpp.Name = ListNth(?msg.Parameters,4);
        ?newcpp.initValues();
        ?newcpp.DbId = SendMsg(?msg,formDbId,0);
        ?newcpp.Type = ListNth(?msg.Parameters,3);

/* --- postcond with transmitter icon */
        broker.changeState(?newcpp,Status,NotExisting);
        broker.changeState(?newcpp,ChangedStatus,Unmodified);

/* --- postcond with postcondition icon */
        ?flow.EMSet +== ?newcpp;
}
/* ------------------------------------------------------------ *
    ACTIVITY:   `unnamedActivity'
        type:       activity with state change icon
        on page:    005 `ESed1'
        refined:    no
        rule:       unnamedActivity_ESed_3
        ruleset:    ESed PRE-CONDITIONS:
        objectDeleted
        find flow
        shadow object exists
    ACTIVITY:
    POST-CONDITIONS:
        unlink object
        delete object
 * ------------------------------------------------------------ */ fcrule unnamedActivity_ESed_3 in ESed {
if:
    /* --- precond with receiver icon */
        ?msg.Sender == ESed;
        ?msg.MsgName == objectDeleted;
    /* --- precond with precondition icon */
        ?DbId = ?msg.formDbId(0);
        ?flow == instanceof EslObj;
        ?flow.DbId == ?DbId;
    /* --- precond with precondition icon */
        local ?cpp == find ?flow.EMSet;
        local ?cpp.Name == ListNth(?msg.Parameters,4);
then:
    /* --- activity with state change icon */
```

```
    /* --- postcond with postcondition icon */
       ?flow.EMSet === ?cpp;
    /* --- postcond with postcondition icon */
       DeleteObject(?cpp);
}
/* ------------------------------------------------------------- *
   ACTIVITY:  `unnamedActivity'
      type:    activity with state change icon
      on page: 005 `ESed1'
      refined: no
      rule:    unnamedActivity_ESed_4
      ruleset: ESed PRE-CONDITIONS:
      objectRenamed
      find flow
      shadow object exists
   ACTIVITY:
   POST-CONDITIONS:
      set new name
 * ------------------------------------------------------------- */ fcrule unnamedActivity_ESed_4 in ESed {
if:
    /* --- precond with receiver icon */
       ?msg.Sender == ESed;
       ?msg.MsgName == objectRenamed;
    /* --- precond with precondition icon */
       ?DbId = ?msg.formDbId(0);
       ?flow == instanceof EslObj;
       ?flow.DbId == ?DbId;
    /* --- precond with precondition icon */
       local ?cpp == find ?flow.EMSet;
       local ?cpp.Name == ListNth (?msg.Parameters, 4);
then:
    /* --- activity with state change icon */
    /* --- postcond with postcondition icon */
       ?cpp.Name = ListNth(?msg.Parameters,5);
}
/* ------------------------------------------------------------- *
   ACTIVITY:  `ESed2'
      type:    connector with mooring icon
      on page: 005 `ESed1'
      refined: yes
      rule:    ESed2_ESed_5
      ruleset: ESed PRE-CONDITIONS:
   ACTIVITY:
      ESed2
   POST-CONDITIONS:
 * ------------------------------------------------------------- */

/* no code available*/

/* ------------------------------------------------------------- *
   ACTIVITY:  `read from DB'
      type:    activity with box icon
      on page: 006 `ESed2'
```

```
        refined:    no
        rule:       readFromDB_ESed_6
        ruleset:    ESed PRE-CONDITIONS:
        flowOpened
        FB?
        find ESed process
    ACTIVITY:
        read from DB
    POST-CONDITIONS:
        link flow
        fetch FU's
*  ------------------------------------------------------------------------  */ fcrule readFromDB_ESed_6 in ESed {
if:
    /* --- precond with receiver icon */
        ?msg.Sender == ESed;

?msg.MsgName == flowOpened;
    /* --- precond with precondition icon */
        ListNth(?msg.Parameters,2) == "";
    /* --- precond with precondition icon */
        ?process == instanceof ToolProcessObj;
        ?process.Pid == ?msg.SendersPid;
then:
    /* --- activity with box icon */
        ?flow = db.GetAssInfo(SendMsg(?msg,formDbId,0),"");
    /* --- postcond with postcondition icon */
        ?process.ObjectSet +== ?flow;
        ?flow.ProcessList +== ?process;
    /* --- postcond with postcondition icon */
}
/* ------------------------------------------------------------------------  *
    ACTIVITY:   `shadow object'
        type:       activity with stamp icon
        on page:    006 `ESed2'
        refined:    no
        rule:       shadowObject_ESed_7
        ruleset:    ESed PRE-CONDITIONS:
        flowCreated
        FB?
        find ESed process
    ACTIVITY:
        shadow object
    POST-CONDITIONS:
        link flow
        set initial values
        ChangeStatus,
        SimulationStatus,
        Status
*  ------------------------------------------------------------------------  */ fcrule shadowObject_ESed_7 in ESed {
if:
    /* --- precond with receiver icon */
```

```
        ?msg.Sender == ESed;
        ?msg.MsgName == flowCreated;

/* --- precond with precondition icon */
        ListNth(?msg.Parameters,2) == "";
     /* --- precond with precondition icon */
        ?process == instanceof ToolProcessObj;
        ?process.Pid == ?msg.SendersPid;
  then:
     /* --- activity with stamp icon */
        ?flow = MakeAnonymousInstance(assistent,FB);

/* --- postcond with postcondition icon */
        ?process.ObjectSet +== ?flow;
        ?flow.ProcessList +== ?process;
     /* --- postcond with postcondition icon */
        ?flow.initValues();
        ?flow.Type = FB;
        ?flow.Name = ListNth(?msg.Parameters,1);
        ?flow.DbId = SendMsg(?msg.formDbId,0);
     /* --- postcond with transmitter icon */
        broker.changeState(?flow,Status,Working);
        Broker.changeState(?flow,ChangedStatus,Unmodified);
        broker.changeState(?flow,SimulationStatus,Unsimulated);
}

/* ---------------------------------------------------------------- *
     ACTIVITY:  `ESed3'
        type:     connector with mooring icon
        on page:  006 `ESed2'
        refined:  yes
        rule:     ESed3_ESed_8
        ruleset:  ESed PRE-CONDITIONS:
     ACTIVITY:
        ESed3
     POST-CONDITIONS:
 * ---------------------------------------------------------------- */

/* no code available*/

/* ---------------------------------------------------------------- *
     ACTIVITY:  `close all subobjects and abort'
        type:     activity with box icon
        on page:  007 `ESed3'
        refined:  no
        rule:     closeAllSubobjectsAndAbort_ESed_9
        ruleset:  ESed PRE-CONDITIONS:
        flowAborted
        find FB flow
     ACTIVITY:
        close all subobjects and abort
     POST-CONDITIONS:
 * ---------------------------------------------------------------- */ fcrule closeAllSubobjectsAndAbort_ESed_9 in ESed {
```

```
if:
    /* --- precond with receiver icon */
        ?msg.Sender == ESed;
        ?msg.MsgName == flowAborted;

/* --- precond with precondition icon */
        ?DbId = ?msg.formDbId(0);
        ?flow == instanceof FB;
        ?flow.DbId == ?DbId;
then:
    /* --- activity with box icon */
        for ?fu inlist all ?flow.FUSet;
          do {for ?cpp inlist all ?fu.EMSet;
              do broker.requestService(?cpp,ESed,close);
              DeleteObject(?fu);
          }
        DeleteObject(?flow);
        db.abort();
}
/* --------------------------------------------------------------- *
    ACTIVITY:   `close all subobjects and abort'
        type:       activity with box icon
        on page:    007 `ESed3'
        refined:    no
        rule:       closeAllSubobjectsAndAbort_ESed_10
        ruleset:    ESed PRE-CONDITIONS:
        flowAborted
        find FU flow
    ACTIVITY:
        close all subobjects and abort POST-CONDITIONS:
 * --------------------------------------------------------------- */ fcrule closeAllSubobjectsAndAbort_ESed_10 in ESed {
if:
    /* --- precond with receiver icon */
        ?msg.Sender == ESed;
        ?msg.MsgName == flowAborted;

/* --- precond with precondition icon */
        ?DbId = ?msg.formDbId(0);
        ?flow == instanceof FU;
        ?flow.DbId == ?DbId;
then:
    /* --- activity with box icon */
        for ?cpp inlist all ?flow.EMSet;
          do broker.requestService(?cpp,ESed,close);
        DeleteObject(?flow);
        db.abort();
}
/* --------------------------------------------------------------- *
    ACTIVITY:   `unnamedActivity'
        type:       activity with state change icon
        on page:    007 `ESed3'
        refined:    no
        rule:       unnamedActivity_ESed_11
```

```
        ruleset:  ESed

PRE-CONDITIONS:
        flowChanged
        find flow
    ACTIVITY:
    POST-CONDITIONS:
        set change status
        set change time
 * ----------------------------------------------------------------- */ fcrule unnamedActivity_ESed_11 in ESed {
if:
    /* --- precond with receiver icon */
        ?msg.Sender == ESed;
        ?msg.MsgName == flowChanged;

/* --- precond with precondition icon */
        ?DbId = ?msg.formDbId(0);
        ?flow == instanceof EslObj;
        ?flow.DbId == ?DbId;
then:
    /* --- activity with state change icon */
    /* --- postcond with transmitter icon */
        broker.changeState(?flow,ChangedStatus,ListNth(?msg.Parameters,3));
    /* --- postcond with transmitter icon */
        broker.changeState(?flow,ChangedTime,SendMsg(?flow,getTime));
}
/* -----------------------------------------------------------------  *
    ACTIVITY:  `delete process'
        type:     activity with box icon
        on page:  007 `ESed3'
        refined:  no
        rule:     deleteProcess_ESed_12
        ruleset:  ESed PRE-CONDITIONS:
        ESedQuit find ESed process
    ACTIVITY:
        delete process
    POST-CONDITIONS:
 * ----------------------------------------------------------------- */ fcrule deleteProcess_ESed_12 in ESed {
if:
    /* --- precond with receiver icon */
        ?msg.Sender == ESed;
        ?msg.MsgName == ESedQuit;

/* --- precond with precondition icon */
        ?process == instanceof ToolProcessObj;
        ?process.Pid == ?msg.SendersPid;
then:
    /* --- activity with box icon */
        DeleteObject(?process);
}
/* -----------------------------------------------------------------  *
```

```
    ACTIVITY:    `unnamedActivity'
       type:      activity with state change icon
       on page:   007 `ESed3'
       refined:   no
       rule:      unnamedActivity_ESed_13
       ruleset:   ESed PRE-CONDITIONS:
       StartEditEM
       find FU flow
       find EM
    ACTIVITY:
    POST-CONDITIONS:
       request edit
 * ------------------------------------------------------------------- */ fcrule unnamedActivity_ESed_13 in ESed {
if:
    /* --- precond with receiver icon */
       ?msg.Sender == ESed;
       ?msg.MsgName == StartEditEM;

/* --- precond with precondition icon */
       ?DbId = ?msg.formDbId(0);
       ?flow == instanceof FU;
       ?flow.DbId == ?DbId;
    /* --- precond with precondition icon */
       local ?cpp == find ?flow.EMSet;
       local ?cpp.Name == ListNth(?msg.Parameters,3);
then:
    /* --- activity with state change icon */
    /* --- postcond with transmitter icon */
       broker.requestService(?cpp,ESed,edit);
}
/* -------------------------------------------------------------------- *
    ACTIVITY:    `unnamedActivity'
       type:      activity with state change icon
       on page:   007 `ESed3'
       refined:   no
       rule:      unnamedActivity_ESed_14
       ruleset:   ESed

PRE-CONDITIONS:

transStarted
       find flow
    ACTIVITY:
    POST-CONDITIONS:
       set compilation status
 * ------------------------------------------------------------------- */ fcrule unnamedActivity_ESed_14 in ESed {
if:
    /* --- precond with receiver icon */
       ?msg.Sender == ESed;
       ?msg.MsgName == transStarted;

/* --- precond with precondition icon */
       ?DbId = ?msg.formDbId(0);
```

```
        ?flow == instanceof EslObj;
        ?flow.DbId == ?DbId;
then:
    /* --- activity with state change icon */
    /* --- postcond with transmitter icon */
        broker.changeState(?flow,TranslationStatus,Translating);
}
/* --------------------------------------------------------------- *
    ACTIVITY:   `ESed4'
        type:       connector with mooring icon
        on page:    007 `ESed3'
        refined:    yes
        rule:       ESed4_ESed_15
        ruleset:    ESed PRE-CONDITIONS:
    ACTIVITY:
        ESed4
    POST-CONDITIONS:
 * --------------------------------------------------------------- */

/* no code available*/

/* --------------------------------------------------------------- *
    ACTIVITY:   `unnamedActivity'
        type:       activity with state change icon
        on page:    008 `ESed4'
        refined:    no
        rule:       unnamedActivity_ESed_16
        ruleset:    ESed PRE-CONDITIONS:
        transCompleted
        find flow
    ACTIVITY:
    POST-CONDITIONS:
        set compilation status
        set compilation time
 * --------------------------------------------------------------- */ fcrule unnamedActivity_ESed_16 in ESed {
if:
    /* --- precond with receiver icon */
        ?msg.Sender == ESed;
        ?msg.MsgName == transCompleted;

/* --- precond with precondition icon */
        ?DbId = ?msg.formDbId(0);
        ?flow == instanceof EslObj;
        ?flow.DbId == ?DbId;

then:
    /* --- activity with state change icon */
    /* --- postcond with transmitter icon */
        if ListNth(?msg.Parameters,3) == 0;
            broker.changeState(?flow,TranslationStatus, CorrectlyTranslated);
        else
            broker.changeState(?flow,TranslationStatus, TranslationError);
```

```
    /* --- postcond with transmitter icon */
       broker.changeState(?flow,CompilationTime,SendMsg(?flow,getTime()));
}
/* -------------------------------------------------------------------- *
   ACTIVITY:      `translateFlow'
      type:       activity with pencil icon
      on page:    008 `ESed4'
      refined:    no
      rule:       translateFlow_ESed_17
      ruleset:    ESed PRE-CONDITIONS:
      translate
      find ESed process
   ACTIVITY:
      translateFlow
   POST-CONDITIONS:
      set compilation status
 * -------------------------------------------------------------------- */ fcrule translateFlow_ESed_17 in ESed {
if:
   /* --- precond with receiver icon */
      ?msg.RqstName == translate;
      ?msg.ActiveObj == instanceof BslObj;

/* --- precond with precondition icon */
      ?process == find ?msg.ActiveObj.ProcessList;
      ?process.Type == ESed;
then:
   /* --- activity with pencil icon */
      ?msg.ActiveObj.translateFlow(?process);
   /* --- postcond with transmitter icon */
      broker.changeState(?msg.ActiveObj,CompilationStatus,Compiling);
}
/* -------------------------------------------------------------------- *
   ACTIVITY:      `loadFlow'
      type:       activity with pencil icon
      on page:    008 `ESed4'
      refined:    no
      rule:       loadFlow_ESed_18
      ruleset:    ESed PRE-CONDITIONS:
      load
      find ESed process
   ACTIVITY:
      loadFlow
   POST-CONDITIONS:
 * -------------------------------------------------------------------- */ fcrule loadFlow_ESed_18 in ESed {
if:
   /* --- precond with receiver icon */
      ?msg.RqstName == load;
      ?msg.ActiveObj == instanceof BslObj;

/* --- precond with precondition icon */
      ?process == find ?msg.ActiveObj.ProcessList;
```

```
            ?process.Type == ESed;
    then:
        /* --- activity with pencil icon */
        ?msg.ActiveObj.loadFlow(?process);
    }
    /* ----------------------------------------------------------------- *
        ACTIVITY:     `createFlow'
            type:         activity with pencil icon
            on page:      008 `ESed4'
            refined:      no
            rule:         createFlow_ESed_19
            ruleset:      ESed PRE-CONDITIONS:
            create
            find ESed process
        ACTIVITY:
            createFlow
        POST-CONDITIONS:
    * ----------------------------------------------------------------- */ fcrule createFlow_ESed_19 in ESed {
    if:
        /* --- precond with receiver icon */
        ?msg.RqstName == create;
        ?msg.ActiveObj == instanceof FB;

/* --- precond with precondition icon */
        ?process == find ?msg.ActiveObj.ProcessList;
        ?process.Type == ESed;
    then:
        /* --- activity with pencil icon */
        ?msg.ActiveObj.createFB(?process);
    }
    /* ----------------------------------------------------------------- *
        ACTIVITY:     `saveFlow'
            type:         activity with pencil icon
            on page:      008 `ESed4'
            refined:      no
            rule:         saveFlow_ESed_20
            ruleset:      ESed PRE-CONDITIONS:
            save
            find ESed process
        ACTIVITY:
            saveFlow
        POST-CONDITIONS:
    * ----------------------------------------------------------------- */ fcrule saveFlow_ESed_20 in ESed {
    if:
        /* --- precond with receiver icon */
        ?msg.RqstName == save;
        ?msg.ActiveObj == instanceof EslObj;

/* --- precond with precondition icon */
        ?process == find ?msg.ActiveObj.ProcessList;
        ?process.Type == ESed;
```

```
then:
    /* --- activity with pencil icon */

?msg.ActiveObj.saveFlow(?process);
}
/* -----------------------------------------------------------------------  *
    ACTIVITY:    `quitEsed'
        type:       activity with pencil icon
        on page:    008 `ESed4'
        refined:    no
        rule:       quitEsed_ESed_21
        ruleset:    ESed PRE-CONDITIONS:
        quit
        find ESed process
    ACTIVITY:
        quitEsed
    POST-CONDITIONS:
 * ----------------------------------------------------------------------- */ fcrule quitEsed_ESed_21 in ESed {
if:
    /* --- precond with receiver icon */
       ?msg.RqstName == quit;
       ?msg.ActiveObj == instanceof EslObj;

/* --- precond with precondition icon */
       ?process == find ?msg.ActiveObj.ProcessList;
       ?process.Type == ESed;
then:
    /* --- activity with pencil icon */
       ?process.quit();
}
/* -----------------------------------------------------------------------  *
    ACTIVITY:    `unnamedActivity'
        type:       activity with box icon
        on page:    008 `ESed4'
        refined:    no
        rule:       unnamedActivity_ESed_22
        ruleset:    ESed PRE-CONDITIONS:
        test actbrowser
    ACTIVITY:
    POST-CONDITIONS:
 * ----------------------------------------------------------------------- */ fcrule unnamedActivity_ESed_22 in ESed {
if:
    /* --- precond with precondition icon */
       ?msg.MsgName == edit;
       ?msg.ActiveObj == instanceof TextObj;
       ?msg.presentAlternative("edit",ESed);
       ?msg.ActiveObj.Selected == TRUE;
       ?msg.ActiveObj.SelectedActivity == edit;
then:
    /* --- activity with box icon */
       Print("It works!!!");
```

```
}
/* ---------------------------------------------------------------- *
    ACTIVITY:      'read from DB'
       type:       activity with box icon
       on page:    006 `ESed2'
       refined:    no
       rule:       readFromDB_ESed_23 ruleset:    ESed

PRE-CONDITIONS:
       flowOpened
       FU?
       find FB
    ACTIVITY:
       read from DB
    POST-CONDITIONS:
       link flow
       fetch EM's
 * ---------------------------------------------------------------- */ fcrule readFromDB_ESed_23 in ESed {
if:
    /* --- precond with receiver icon */
       ?msg.Sender == ESed;
       ?msg.MsgName == flowOpened;
    /* --- precond with precondition icon */
       ListNth(?msg.Parameters,2) != "";
    /* --- precond with precondition icon */
       ?DbId = ?msg.formDbId(0);
       ?fb == instanceof FB;
       ?fb.DbId == ?DbId;
then:
    /* --- activity with box icon */
       ?flow = db.GetAssInfo(SendMsg(?msg,formDbId,0),"");
    /* --- postcond with postcondition icon */
       ?fb.FUSet +== ?flow;

/* --- postcond with postcondition icon */
}
/* ---------------------------------------------------------------- *
    ACTIVITY:      'shadow object'
       type:       activity with stamp icon
       on page:    006 `ESed2'
       refined:    no
       rule:       shadowObject_ESed_24
       ruleset:    ESed PRE-CONDITIONS:
       flowCreated
       FU?
       find FB
    ACTIVITY:
       shadow object
    POST-CONDITIONS:
       link flow
       set initial values
       ChangeStatus,
       SimulationStatus,
```

```
        Status
*  ------------------------------------------------------------------------ */ fcrule shadowObject_ESed_24 in ESed {
if:
    /* --- precond with receiver icon */
        ?msg.Sender == ESed;
        ?msg.MsgName == flowCreated;

/* --- precond with precondition icon */
        ListNth(?msg.Parameters,2) != "";
    /* --- precond with precondition icon */
        ?DbId = ?msg.formDbId(0);
        ?fb == instanceof FB;

?fb.DbId == ?DbId;
then:
    /* --- activity with stamp icon */
        ?flow = MakeAnonymousInstance(assistent,FU);
    /* --- postcond with postcondition icon */
        ?fb.FUSet +== ?flow;

/* --- postcond with postcondition icon */
        ?flow.initValues();
        ?flow.Type = FU;
        ?flow.Name = ListNth(?msg.Parameters,2);
        ?flow.DbId = SendMsg(?msg,formDbId,0);
    /* --- postcond with transmitter icon */
        broker.changeState(?flow,Status,Working);
        Broker.changeState(?flow,ChangedStatus,Unmodified);
        broker.changeState(?flow,SimulationStatus,Unsimulated);
}
/* ------------------------------------------------------------------------ *
    ACTIVITY:    `ESed2.5'
        type:        connector with mooring icon
        on page:     006 `ESed2'
        refined:     yes
        rule:        ESed25_ESed_25
        ruleset:     ESed PRE-CONDITIONS:
    ACTIVITY:
        ESed2.5
    POST-CONDITIONS:
*  ------------------------------------------------------------------------ */

/* no code available*/

/* ------------------------------------------------------------------------ *
    ACTIVITY:    `save shadow object'
        type:        activity with box icon
        on page:     009 `ESed2.5'
        refined:     no
        rule:        saveShadowObject_ESed_26
        ruleset:     ESed PRE-CONDITIONS:
        flowSavedInDb
        find flow
```

```
    ACTIVITY:
        save shadow object
    POST-CONDITIONS:
        set save time
 * ------------------------------------------------------------------ */ fcrule saveShadowObject_ESed_26 in ESed {
if:
    /* --- precond with receiver icon */
        ?msg.Sender == ESed;
        ?msg.MsgName == flowSavedInDb;

/* --- precond with precondition icon */
        ?DbId = ?msg.formDbId(0);
        ?flow == instanceof EslObj;
        ?flow.DbId == ?DbId;
then:
    /* --- activity with box icon */
        ?flow.putInDb();
        db.commit();
    /* --- postcond with transmitter icon */ broker.changeState(?flow,SavedTime,SendMsg(?flow,getTime));
}
/* ------------------------------------------------------------------ *
    ACTIVITY:    `save shadow object under new name'
        type:        activity with box icon
        on page:     009 `ESed2.5'
        refined:     no
        rule:        saveShadowObjectUnderNewName_ESed_27
        ruleset:     ESed PRE-CONDITIONS:
        flowSavedAsInDb
        find flow
    ACTIVITY:
        save shadow object under new name
    POST-CONDITIONS:
        set save time
 * ------------------------------------------------------------------ */ fcrule saveShadowObjectUnderNewName_ESed_27 in ESed {
if:
    /* --- precond with receiver icon */
        ?msg.Sender == ESed;
        ?msg.MsgName == flowSavedAsInDb;

/* --- precond with precondition icon */
        ?DbId = ?msg.formDbId(0);
        ?flow == instanceof EslObj;
        ?flow.DbId == ?DbId;
then:
    /* --- activity with box icon */
        ?flow.DbId = SendMsg(?msg,formDbId,3);
        if ListNth(?msg.Parameters,5) == "";
           ?flow.Name = ListNth(?msg.Parameters,4);
        else
           ?flow.Name = ListNth(?msg.Parameters,5);
        ?flow.putInDb();
```

```
        db.commit();
    /* --- postcond with transmitter icon */
        Broker.changeState(?flow,SavedTime,SendMsg(?flow,getTime));
}
/* ------------------------------------------------------------------ *
    ACTIVITY:      `close all subobjects'
       type:       activity with box icon
       on page:    009 `ESed2.5'
       refined:    no
       rule:       closeAllSubobjects_ESed_28
       ruleset:    ESed PRE-CONDITIONS:
       flowClosed
       find FU flow
    ACTIVITY:
       close all subobjects
    POST-CONDITIONS:
 * ------------------------------------------------------------------ */ fcrule closeAllSubobjects_ESed_28 in ESed {
if:
    /* --- precond with receiver icon */
       ?msg.Sender == ESed;
       ?msg.MsgName == flowClosed;

/* --- precond with precondition icon */

?DbId = ?msg.formDbId(0);
       ?flow == instanceof FU;
       ?flow.DbId == ?DbId;
then:
    /* --- activity with box icon */
       for ?cpp inlist all ?flow.EMSet;
          do broker.requestService(?cpp,ESed,close);
       DeleteObject(?flow);
}
/* ------------------------------------------------------------------ *
    ACTIVITY:      `close all subobjects'
       type:       activity with box icon
       on page:    009 `ESed2.5'
       refined:    no
       rule:       closeAllSubobjects_ESed_29
       ruleset:    ESed PRE-CONDITIONS:
       flowClosed
       find FB flow
    ACTIVITY:
       close all subobjects
    POST-CONDITIONS:
 * ------------------------------------------------------------------ */ fcrule closeAllSubobjects_ESed_29 in ESed {
if:
    /* --- precond with receiver icon */
       ?msg.Sender == ESed;
       ?msg.MsgName == flowClosed;
```

```
    /* --- precond with precondition icon */
       ?DbId = ?msg.formDbId(0);
       ?flow == instanceof FB;
       ?flow.DbId == ?DbId;
then:
    /* --- activity with box icon */
       for ?fu inlist all ?flow.FUSet;
         do {for ?cpp inlist all ?fu.EMSet;
             do broker.requestService(?cpp,ESed,close);
             DeleteObject(?fu);
         }
       DeleteObject(?flow);
}
```

What is claimed is:

1. A method of interactively developing computer programs on an interactive system comprising the steps of:

describing in an descriptive language a process using a graphical language illustrating steps necessary to develop said computer program, the descriptive language executable on the interactive system, said process having a plurality of potential states and defining a plurality of steps necessary to develop a desired computer program, and including a specification for each state of the process of at least one responsive action to be taken in developing the desired computer program; and executing the process by said interactive system to interactively develop the desired computer program, the step of executing including the steps of:

generating an event indicative of the taking of an action by one of a plurality of tools in the development of the desired computer program;

updating of said state of said process to reflect said received event;

analyzing said updated state of said process;

deciding in accordance with the specification of the executing process and the analysis of its updated state at least one suggestion of a responsive procedure to be taken by the tools in developing said computer program; and compiling said procedure into the computer program comprising executable code.

2. The method of claim 1 further including the step of:

automatically invoking at least one of said plurality of tools to implement one of the suggested responsive actions determined in response to said updated state of said process.

3. The method of claim 1 wherein said step of analyzing said updated state includes the steps of:

analyzing said updated state of said process to determine if any errors have occurred in response to updating said state of said process; and determining at least one of said plurality of responsive actions to suggest for correcting said errors.

4. The method of claim 1 further including the steps of:

displaying the suggested responsive procedures for user consideration;

selecting by the user from the displayed suggested responsive procedures or other procedures to be taken by the tools in further developing the selected computer program; and performing of the selected procedure.

5. An apparatus for interactively developing computer program comprising:

an interactive system having an assistant, and a plurality of tools;

means within said assistant for executing a process described in descriptive language, said process having a plurality of potential states and defining in graphical illustrations a plurality of steps necessary to develop a desired computer program and including a specification for each state of the process of at least one responsive action to be taken in developing the desired computer program;

means for receiving, in said assistant, an event indicative of the taking of an action by one of said plurality of tools;

means, in said assistant, for updating said state of said process to reflect said received event;

means, in said assistant, for analyzing said updated state of said process to determine in accordance with the specification of the executing process and the analysis of its updated state at least one suggestion of a responsive procedure to be taken by the tools in developing said computer program; and means for compiling said procedure into the computer program comprising executable code.

6. The apparatus of claim 5 wherein said said assistant further includes:

means for automatically invoking at least one of said plurality of tools to implement one of the suggested responsive actions determined in response to said updated state of said process.

7. The apparatus of claim 5 wherein said means for analyzing said updated state includes:

means for analyzing said updated state of said process to determine if any errors have occurred in response to updating said state of said process; and means for determining at least one of said plurality of responsive actions to suggest for correcting said errors.

8. The apparatus of claim 5 further including a graphical user interface connected to the assistant for displaying the suggested responsive procedures for user consideration, and selecting by the user from the displayed suggested responsive procedures or other procedures, the selected action taken by the tools in further developing the selected computer program.

9. A computing system, comprising:

a plurality of computer based tools for performing actions and originating events concerning the result of the performed actions;

an interactive assistant computing device connected to the plurality of tools and including:

a module storing in a descriptive language using graphical description of a process comprising graphical illustrations of the steps needed to develop a computer program, the process description language specifying for each state of the process at least one responsive action to be taken;

an interpreter for interpreting the process stored in the module including means responsive to reports of events from the tools for changing the state of the process and, in response thereto, suggesting at least one specified procedure for performance by the tools in furtherance of the development of the computer program;

a compiler for compiling said procedure into the computer program comprising executable code; and a message handler connecting the plurality of tools to the assistant computing device, the message handler passing interpreter suggested specified actions to the plurality of tools for performance, and passing events originated in the tools to the interpreter for effecting changes in process state.

10. The system as in claim 9 further comprising a graphical user interface connected to the assistance computing device, the interface displaying for user consideration and selection, prior to any performance by the tools, the interpreter specified procedures.

11. The system as in claim 9 wherein the interpreter comprises an expert system.

12. A method for developing a computer program, comprising the steps of:

describing in an interactive system a process using graphical language, said process including a graphical description illustrating the steps needed to be performed in developing the computer program, the described process having a plurality of states and the description specifying for each state at least one action responsive to the state to be taken in furtherance of developing the computer program;

executing the process described in graphical language by the interactive system;

generating events indicative of the taking of an action in furtherance of developing the computer program;

changing the state of the process to account for the generated events;

processing the changed state of the process in accordance with the description of the process to identify the description specified actions responsive to the changed state;

suggesting at least one responsive procedure to be taken by the tools in developing the computer program; and compiling said procedure into the computer program comprising executable code.

13. The method as in claim 12 further including the step of automatically taking the next action in response to the suggestion.

14. The method as in claim 12 further including the steps of:

presenting the next action to a user for consideration; and taking either the suggested next action or another action in response to the user selection.

* * * * *